United States Patent
Szewczyk et al.

(10) Patent No.: US 9,801,129 B2
(45) Date of Patent: Oct. 24, 2017

(54) SYSTEMS AND METHODS FOR DISSEMINATING MESSAGES AMONG A FABRIC NETWORK

(71) Applicant: Google Inc., Mountain View, CA (US)

(72) Inventors: Robert Szewczyk, Mountain View, CA (US); Vaas Krishnamurthy, Mountain View, CA (US); Robert Quattlebaum, Mountain View, CA (US); Jeffery Theodore Lee, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 456 days.

(21) Appl. No.: 14/478,346

(22) Filed: Sep. 5, 2014

(65) Prior Publication Data
US 2016/0073343 A1 Mar. 10, 2016

(51) Int. Cl.
*H04W 52/02* (2009.01)
*H04L 12/18* (2006.01)
*H04W 84/18* (2009.01)

(52) U.S. Cl.
CPC ..... *H04W 52/0216* (2013.01); *H04L 12/1863* (2013.01); *H04W 84/18* (2013.01); *Y02B 60/50* (2013.01)

(58) Field of Classification Search
CPC .............. H04W 52/0216; H04W 84/18; H04L 12/1863; Y02B 60/50
See application file for complete search history.

(56) References Cited

U.S. PATENT DOCUMENTS

| | | | | |
|---|---|---|---|---|
| 6,731,233 | B2 * | 5/2004 | Hofele | G01S 7/2813 |
| | | | | 342/159 |
| 7,844,212 | B1 * | 11/2010 | Woo | H04H 60/11 |
| | | | | 370/400 |
| 8,045,514 | B2 | 10/2011 | Song et al. | |
| 8,400,934 | B2 | 3/2013 | DiGirolamo et al. | |
| 9,247,396 | B2 * | 1/2016 | Alexander | H04W 4/06 |
| 2006/0133408 | A1 | 6/2006 | Nogueira-Nine et al. | |
| 2006/0268918 | A1 | 11/2006 | Olexa et al. | |
| 2006/0287008 | A1 | 12/2006 | Twitchell, Jr. | |

(Continued)

FOREIGN PATENT DOCUMENTS

WO 2013/170436 11/2013

OTHER PUBLICATIONS

Miller et al., "Minimizing Energy Consumption in Sensor Networks Using a Wakeup Radio." WCNC 2004 / IEEE Communications Society, vol. 4, Mar. 21, 2004, pp. 2335-2340.

(Continued)

*Primary Examiner* — Habte Mered
(74) *Attorney, Agent, or Firm* — Van Court & Aldridge LLP

(57) ABSTRACT

Systems and methods for waking a fabric network of devices and communicating messages among the devices are described herein. An electronic device can communicate with other electronic devices of a fabric network broadcasting a wake message to the fabric network in response to an awakening event. The wake message can include a reason for triggering a wakeup of each device in the fabric network and a wake time signaling period. After the wake time signaling period lapses, a fabric message can be broadcasted to the fabric network, and the fabric message can be selectively rebroadcasted.

35 Claims, 16 Drawing Sheets

(56) References Cited

U.S. PATENT DOCUMENTS

| | | |
|---|---|---|
| 2009/0074033 A1 | 3/2009 | Kattwinkel |
| 2009/0103501 A1 | 4/2009 | Farrag et al. |
| 2009/0122737 A1 | 5/2009 | Twitchell, Jr. |
| 2011/0176465 A1 | 7/2011 | Panta et al. |
| 2012/0131369 A1 | 5/2012 | Paljug |
| 2013/0177110 A1 | 7/2013 | Rangarajan et al. |
| 2013/0201884 A1 | 8/2013 | Freda et al. |
| 2014/0307608 A1 | 10/2014 | Lei |

OTHER PUBLICATIONS

"IEEE Standard for Low-Rate Wireless Personal Area Networks (WPANs); P802.15.4-REVb-DF1." IEEE Draft; vol. 802.15, Jun. 14, 2014, XP068066396, Sections 5.11 (pp. 87-102), 5.12 (pp. 102-108), 5.2.8 (p. 44), 6.3.7 (p. 138), 6.5.1.3 (pp. 142-143), 7.4.2.5 (pp. 333-334), 9.2.7 (pp. 375-376).

* cited by examiner

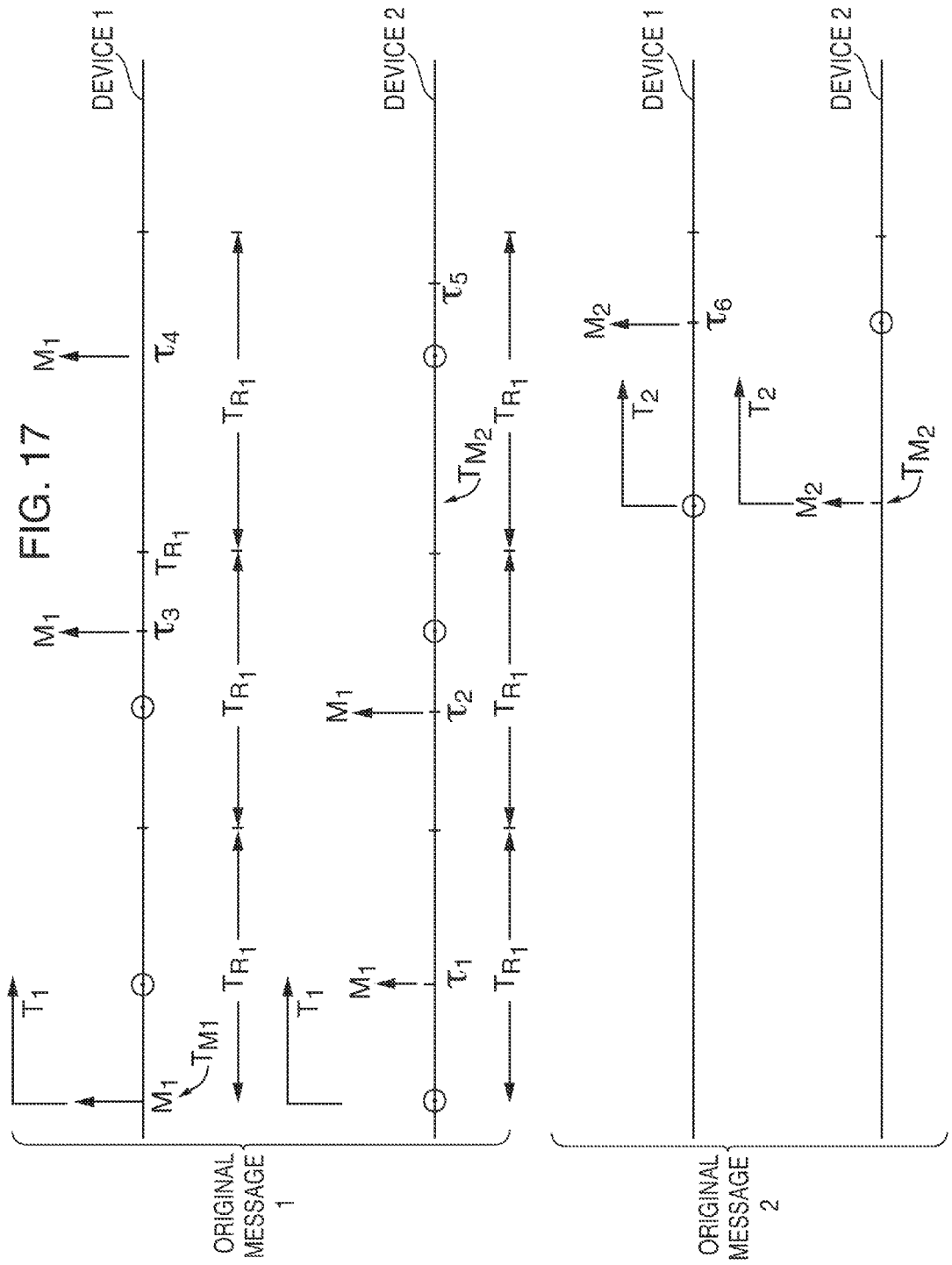

SYSTEMS AND METHODS FOR DISSEMINATING MESSAGES AMONG A FABRIC NETWORK

TECHNICAL FIELD

This patent specification relates to systems and methods for disseminating messages among a fabric network of low-power or sleepy devices. More particularly, this specification relates to techniques for waking up the devices that form the fabric network and distributing messages to the devices via the fabric network.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Network-connected devices appear throughout homes, office buildings, and other structures. Some of these devices are capable of communicating with each other using a network. Some of these devices may be hazard detection systems, such as smoke detectors, carbon monoxide detectors, combination smoke and carbon monoxide detectors, or may be other systems for detecting other conditions have been used in residential, commercial, and industrial settings for safety and security considerations. When one of these devices detects a condition that warrants action, it may be desirable to communicate the detected condition to the other devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods for waking a fabric network of devices and communicating messages among the devices are described herein. An electronic device can communicate with other electronic devices of a fabric network broadcasting a wake message to the fabric network in response to an awakening event, wherein the wake message comprises a reason for triggering a wakeup of each device in the fabric network and a wake time signaling period. After the wake time signaling period lapses, a fabric message can be broadcasted to the fabric network, and the fabric message can be selectively rebroadcasted.

In one embodiment, a device can wake up other devices of a fabric network generating a plurality of wake packets each including a plurality of fields, wherein a first field defines a wake time remaining period, broadcasting the wake packets in a non-clear channel assessment (NCCA) mode for a NCCA time period, and after the NCCA time period elapses, broadcasting the wake packets in a clear channel assessment (CCA) mode for the remainder of the wake time remaining period. The wake time remaining period is sufficiently long to ensure the wake packet propagates across the fabric network to wake each device of the fabric network.

In another embodiment, a first device that forms part of a fabric network can receive a wake packet from a second device of the fabric network, wherein the wake package comprises a plurality of fields, wherein a first field defines a wake time remaining period. The first device can determine whether the second device is rebroadcasting the received wake packet, and in response to determining that the second device is not rebroadcasting the received wake packet, the device can generate a plurality of rebroadcast wake packets based on the received wake packet, each rebroadcast wake packet comprising a plurality of fields, wherein a first field defines an updated wake time remaining period, and broadcast the rebroadcast wake packets in a non-clear channel assessment (NCCA) mode until a NCCA time period elapses. After the NCCA time period elapses, the rebroadcast wake packets can be rebroadcasted in a clear channel assessment (CCA) mode for the remainder of the updated wake time remaining period.

A method for communicating messages among devices of a fabric network is provided. The method can include managing, for a received message, a plurality of variables, the plurality of variables comprising a counter, a rebroadcast time period, a rebroadcasting decision point, and a first timer, wherein the rebroadcasting decision point exists within the rebroadcast time period, and wherein the first tinier is reset at a beginning of the rebroadcast time period. The method includes determining when the first tinier is equal to the rebroadcasting decision point, and rebroadcasting the received message if the counter is determined to be less than a threshold when the first timer is determined to be equal to the rebroadcasting decision point.

Another method for communicating messages among devices of a fabric network is provided. The method can include detecting a state change that triggers a message transmission from an originator device, wherein in response to the detecting, the method further includes broadcasting a message from the originator device, creating a message timer, resetting a counter, determining a rebroadcast time period that repeats for the duration of the message timer; and selectively rebroadcasting the message during any one of the repeated rebroadcast time periods.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

A further understanding of the nature and advantages of the embodiments discussed herein may be realized by reference to the remaining portions of the specification and the drawings.

BRIEF DESCRIPTION OF THE DRAWINGS

FIG. 17 shows illustrative timing diagrams of a two device fabric network, according to embodiment.

DETAILED DESCRIPTION OF THE DISCLOSURE

Figure 1:
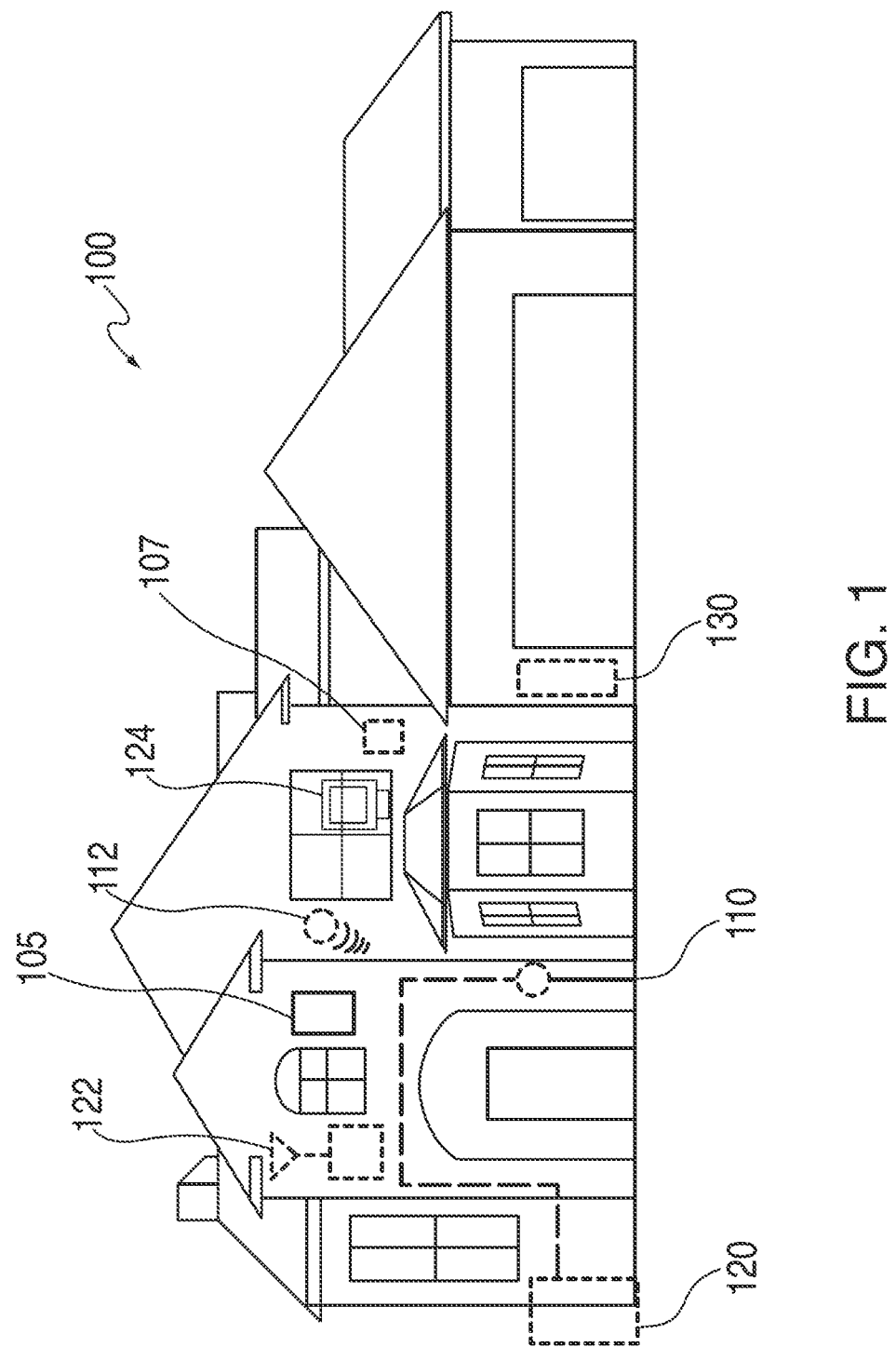
FIG. 1 is a diagram of an enclosure with a hazard detection system, according to some embodiments.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more hazard detection embodiments are described further herein in the context of being used in a residential home, such as a single-family residential home, the scope of the present teachings is not so limited. More generally, hazard detection systems are applicable to a wide variety of enclosures such as, for example, duplexes, townhomes, multi-unit apartment buildings, hotels, retail stores, office buildings, and industrial buildings. Further, it is understood that while the terms user, customer, installer, homeowner, occupant, guest, tenant, landlord, repair person, and the like may be used to refer to the person or persons who are interacting with the hazard detector in the context of one or more scenarios described herein, these references are by no means to be considered as limiting the scope of the present teachings with respect to the person or persons who are performing such actions.

This disclosure relates to efficient communication that may be used by devices communicating with each other in a home environment. The efficient communication may enable a fabric of devices and/or services to communicate in the home environment. Indeed, enhanced safety may be realized if one device is able to communicate a detected condition (e.g., an alarm condition or a security condition) to the other devices in the fabric network. For example, if an originator device detects presence of a pre-alarm fire condition, that originator device may cause remote devices in the fabric network to wake up and inform the remote devices of the pre-alarm fire condition. The remote devices may take an action responsive to being informed of the pre-alarm condition (e.g., such as by following a state machine of the originator device or audibly announcing that a pre-alarm condition exists at the location of the originator device). Additionally, an added convenience may be realized by enabling a remote device to communicate with the originator device. For example, assume a remote device has announced the presence of a condition in response to receiving an indication of that condition from the originator device. A user may interact with the remote device to hush the announcement. In response to the user interaction, the remote device may transmit a message back to the originator device, which may change its operational state (e.g., to a state that hushes the announcement) in response the remote device's message. If the originator device changes its state, it may disseminate this change as a new message to the remote devices of the fabric network, thereby enabling the remote devices to take an appropriate action in response thereto.

The fabric network may be supported by an efficient communication scheme involving, for example, an efficient network layer, an efficient platform layer, and/or an efficient application layer to manage communication. The fabric network may support Internet Protocol version 6 (IPv6) communication such that each connected device may have a unique local address (ULA). Moreover, to enable each device to integrate with a home, the devices may be placed anywhere in a home which necessitates support for long term operation on a limited battery. As a result, each device must be able to achieve the communication goals using minimal amount of energy Additional details of an exemplary fabric network can be found in U.S. patent application Ser. No. 13/926,335, filed Jun. 25, 2013, the disclosure of which is incorporated by reference in its entirety.

This disclosure more particularly relates to systems and methods for waking a fabric network of devices and communicating messages among the devices. The devices spend a majority of their operational lives in a low power or sleepy state; as a result the devices may need to be woken up before they can take appropriate action. Thus various embodiments described herein specify how the devices can be woken up. For example, each of the devices that comprise the fabric network may be woken up in such a way that each device is awake and ready to communicate fabric messages within a fixed time period. As a further example, the awakening of the fabric network can be achieved by transmitting wake packets. The wake packets can include a reason that enables the devices to take appropriate pre-emptive action in response thereto, before fabric messages can be disseminated throughout the fabric network. Additional embodiments described herein specify how fabric messages are disseminated throughout the fabric network. The fabric messages can contain more detailed information than that contained in the wake packets and can be communicated among the devices after the fabric network is woken up. Each device in the fabric network may control its own rebroadcasting scheme to selectively rebroadcast a fabric message to ensure full fabric penetration without oversaturating the network. Additional details on these embodiments are described more fully below.

FIG. 1 is a diagram illustrating an exemplary enclosure 100 using hazard detection system 105, remote hazard detection system 107, thermostat 110, remote thermostat 112, heating, cooling, and ventilation (HVAC) system 120, router 122, computer 124, and central panel 130 in accordance with some embodiments. Enclosure 100 can be, for example, a single-family dwelling, a duplex, an apartment within an apartment building, a warehouse, or a commercial structure such as an office or retail store. Hazard detection system 105 can be battery powered, line powered, or line powered with a battery backup. Hazard detection system 105 can include one or more processors, multiple sensors, non-volatile storage, and other circuitry to provide desired safety monitoring and user interface features. Some user interface features may only be available in line powered embodiments due to physical limitations and power constraints. In addition, some features common to both line and battery powered embodiments may be implemented differently. Hazard detection system 105 can include the following components: low power wireless personal area network (6LoWPAN) circuitry, a system processor, a safety processor, non-volatile memory (e.g., Flash), WiFi circuitry, an ambient light sensor (ALS), a smoke sensor, a carbon monoxide (CO) sensor, a temperature sensor, a humidity sensor, a noise sensor, one or more ultrasonic sensors, a passive infra-red (PIR) sensor, a speaker, one or more light emitting diodes (LED's), and an alarm buzzer.

Hazard detection system 105 can monitor environmental conditions associated with enclosure 100 and alarm occupants when an environmental condition exceeds a predetermined threshold. The monitored conditions can include, for example, smoke, heat, humidity, carbon monoxide, radon, methane and other gasses. In addition to monitoring the safety of the environment, hazard detection system 105 can provide several user interface features not found in conventional alarm systems. These user interface features can include, for example, vocal alarms, voice setup instructions, cloud communications (e.g. push monitored data to the cloud, or push notifications to a mobile telephone, or receive software updates from the cloud), device-to-device communications (e.g., communicate with other hazard detection systems in the enclosure), visual safety indicators (e.g., display of a green light indicates it is safe and display of a red light indicates danger), tactile and non-tactile input command processing, and software updates.

Hazard detection system 105 can monitor other conditions that not necessarily tied to hazards, per se, but can be configured to perform a security role. In the security role, system 105 may monitor occupancy (using a motion detector), ambient light, sound, remote conditions provided by remote sensors (door sensors, window sensors, and/or motion sensors). In some embodiments, system 105 can perform both hazard safety and security roles, and in other embodiments, system 105 may perform one of a hazard safety role and a security role.

Hazard detection system 105 can implement multi-criteria state machines according to various embodiments described herein to provide advanced hazard detection and advanced user interface features such as pre-alarms. In addition, the multi-criteria state machines can manage alarming states and pre-alarming states and can include one or more sensor state machines that can control the alarming states and one or more system state machines that control the pre-alarming states. Each state machine can transition among any one of its states based on sensor data values, hush events, and transition conditions. The transition conditions can define how a state machine transitions from one state to another, and ultimately, how hazard detection system 105 operates. Hazard detection system 105 can use a dual processor arrangement to execute the multi-criteria state machines according to various embodiments. The dual processor arrangement may enable hazard detection system 105 to manage the alarming and pre-alarming states in a manner that uses minimal power while simultaneously providing failsafe hazard detection and alarming functionalities. Additional details of the various embodiments of hazard detection system 105 are discussed below.

Enclosure 100 can include any number of hazard detection systems. For example, as shown, hazard detection system 107 is another hazard detection system, which may be similar to system 105. In one embodiment, both systems 105 and 107 can be battery powered systems. In another embodiment, system 105 may be line powered, and system 107 may be battery powered. Moreover, a hazard detection system can be installed outside of enclosure 100.

Thermostat 110 can be one of several thermostats that may control HVAC system 120. Thermostat 110 can be referred to as the "primary" thermostat because it may be electrically connected to actuate all or part of an HVAC system, by virtue of an electrical connection to HVAC control wires (e.g. W, G, Y, etc.) leading to HVAC system 120. Thermostat 110 can include one or more sensors to gather data from the environment associated with enclosure 100. For example, a sensor may be used to detect occupancy, temperature, light and other environmental conditions within enclosure 100. Remote thermostat 112 can be referred to as an "auxiliary" thermostat because it may not be electrically connected to actuate HVAC system 120, but it too may include one or more sensors to gather data from the environment associated with enclosure 100 and can transmit data to thermostat 110 via a wired or wireless link. For example, thermostat 112 can wirelessly communicate with and cooperates with thermostat 110 for improved control of HVAC system 120. Thermostat 112 can provide additional temperature data indicative of its location within enclosure 100, provide additional occupancy information, or provide another user interface for the user (e.g., to adjust a temperature setpoint).

Hazard detection systems 105 and 107 can communicate with thermostat 110 or thermostat 112 via a wired or wireless link. For example, hazard detection system 105 can wirelessly transmit its monitored data (e.g., temperature and occupancy detection data) to thermostat 110 so that it is provided with additional data to make better informed decisions in controlling HVAC system 120. Moreover, in some embodiments, data may be transmitted from one or more of thermostats 110 and 112 to one or more of hazard detections systems 105 and 107 via a wired or wireless link (e.g., the fabric network).

Central panel 130 can be part of a security system or other master control system of enclosure 100. For example, central panel 130 may be a security system that may monitor windows and doors for break-ins, and monitor data provided by motion sensors. In some embodiments, central panel 130 can also communicate with one or more of thermostats 110 and 112 and hazard detection systems 105 and 107. Central panel 130 may perform these communications via wired link, wireless link (e.g., the fabric network), or a combination thereof. For example, if smoke is detected by hazard detection system 105, central panel 130 can be alerted to the presence of smoke and make the appropriate notification, such as displaying an indicator that a particular zone within enclosure 100 is experiencing a hazard condition.

Enclosure 100 may further include a private network accessible both wirelessly and through wired connections and may also be referred to as a Local Area Network or LAN. Network devices on the private network can include hazard detection systems 105 and 107, thermostats 110 and 112, computer 124, and central panel 130. In one embodiment, the private network is implemented using router 122, which can provide routing, wireless access point functionality, firewall and multiple wired connection ports for connecting to various wired network devices, such as computer 124. Wireless communications between router 122 and networked devices can be performed using an 802.11 protocol. Router 122 can further provide network devices access to a public network, such as the Internet or the Cloud, through a cable-modem, DSL modem and an Internet service provider or provider of other public network services. Public networks like the Internet are sometimes referred to as a Wide-Area Network or WAN.

Access to the Internet, for example, may enable networked devices such as system 105 or thermostat 110 to communicate with a device or server remote to enclosure 100. The remote server or remote device can host an account management program that manages various networked devices contained within enclosure 100. For example, in the context of hazard detection systems according to embodiments discussed herein, system 105 can periodically upload data to the remote server via router 122. In addition, if a hazard event is detected, the remote server or remote device can be notified of the event after system 105 communicates the notice via router 122. Similarly, system 105 can receive data (e.g., commands or software updates) from the account management program via router 122.

Hazard detection system 105 can operate in one of several different power consumption modes. Each mode can be characterized by the features performed by system 105 and the configuration of system 105 to consume different amounts of power. Each power consumption mode corresponds to a quantity of power consumed by hazard detection system 105, and the quantity of power consumed can range from a lowest quantity to a highest quantity. One of the power consumption modes corresponds to the lowest quantity of power consumption, and another power consumption mode corresponds to the highest quantity of power consumption, and all other power consumption modes fall somewhere between the lowest and the highest quantities of power consumption. Examples of power consumption modes can include an Idle mode, a Log Update mode, a Software Update mode, an Alarm mode, a Pre-Alarm mode, a Hush mode, and a Night Light mode. These power consumption modes are merely illustrative and are not meant to be limiting. Additional or fewer power consumption modes may exist. Moreover, any definitional characterization of the different modes described herein is not meant to be all inclusive, but rather, is meant to provide a general context of each mode.

Although one or more states of the sensor state machines and system state machines may be implemented in one or more of the power consumption modes, the power consumption modes and states may be different. For example, the power consumption mode nomenclature is used in connection with various power budgeting systems and methods that are explained in more detail in U.S. Provisional Application Nos. 61/847,905 and 61/847,916.

Figure 2:
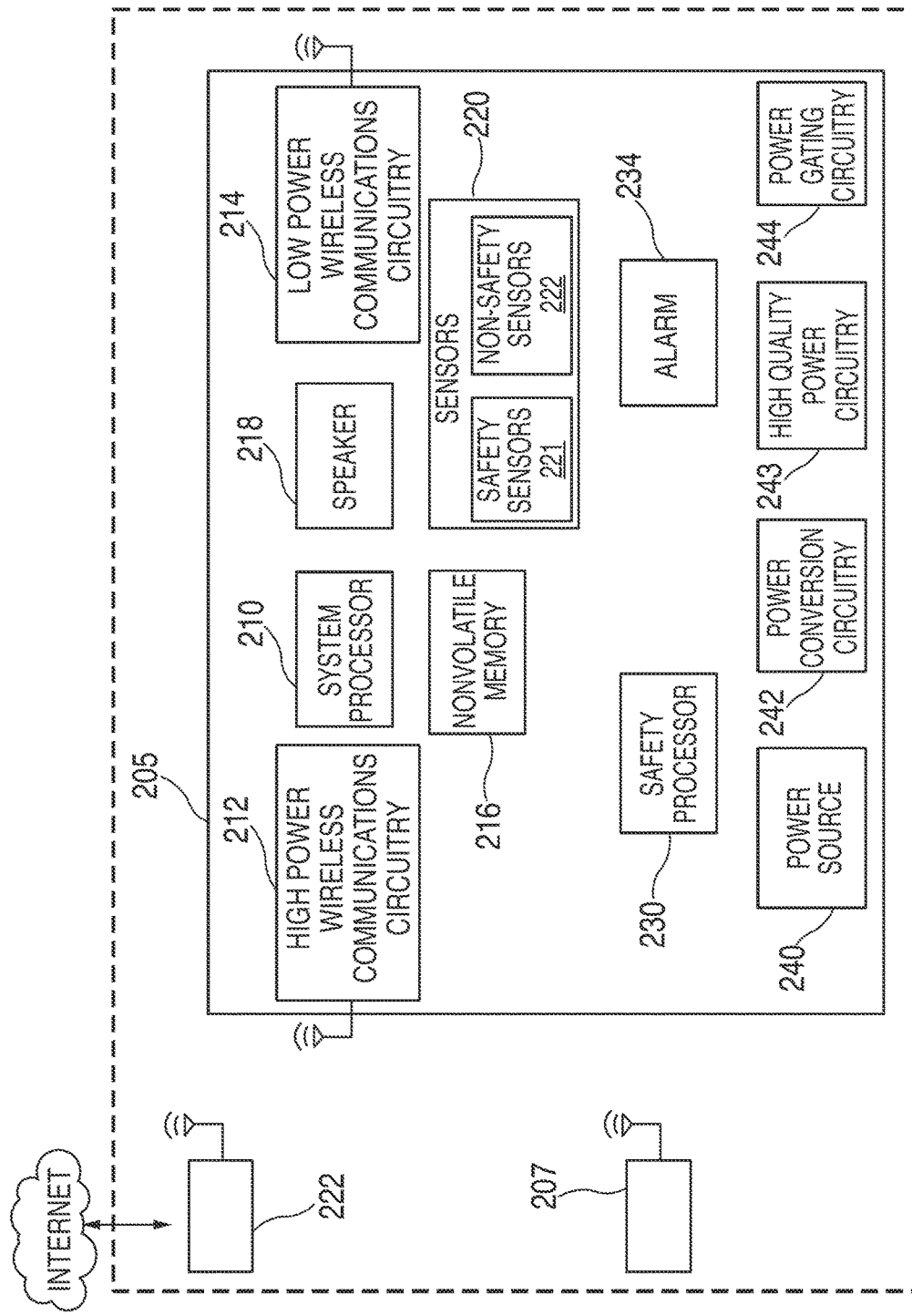
FIG. 2 shows an illustrative block diagram of a hazard detection system being used in an illustrative enclosure, according to some embodiments.

FIG. 2 shows an illustrative block diagram of hazard detection system 205 being used in an illustrative enclosure 200 in accordance with some embodiments. FIG. 2 also shows optional hazard detection system 207 and router 222. Hazard detection systems 205 and 207 can be similar to hazard detection systems 105 and 107 in FIG. 1, enclosure 200 can be similar to enclosure 100 in FIG. 1, and router 222 can be similar to router 122 in FIG. 1. Hazard detection system 205 can include several components, including system processor 210, high-power wireless communications circuitry 212 and antenna, low-power wireless communications circuitry 214 and antenna, non-volatile memory 216, speaker 218, sensors 220, which can include one or more safety sensors 221 and one or more non-safety sensors 222, safety processor 230, alarm 234, power source 240, power conversion circuitry 242, high quality power circuitry 243, and power gating circuitry 244. Hazard detection system 205 may be operative to provide failsafe safety detection features and user interface features using circuit topology and power budgeting methods that may minimize power consumption.

Hazard detection system 205 can use a bifurcated processor circuit topology for handling the features of system 205. Both system processor 210 and safety processor 230 can exist on the same circuit board within system 205, but perform different tasks. System processor 210 is a larger more capable processor that can consume more power than safety processor 230. System processor 210 can be operative to process user interface features. For example, processor 210 can direct wireless data traffic on both high and low power wireless communications circuitries 212 and 214, access non-volatile memory 216, communicate with processor 230, and cause audio to be emitted from speaker 218. As another example, processor 210 can monitor data acquired by one or more sensors 220 to determine whether any actions need to be taken (e.g., shut off a blaring alarm in response to a user detected action to hush the alarm).

Safety processor 230 can be operative to handle safety related tasks of system 205. Safety processor 230 can poll one or more of sensors 220 and activate alarm 234 when one or more of sensors 220 indicate a hazard event is detected. Processor 230 can operate independently of processor 210 and can activate alarm 234 regardless of what state processor 210 is in. For example, if processor 210 is performing an active function (e.g., performing a WiFi update) or is shut down due to power constraints, processor 230 can activate alarm 234 when a hazard event is detected. In some embodiments, the software running on processor 230 may be permanently fixed and may never be updated via a software or firmware update after system 205 leaves the factory. In other embodiments, processor 230 may be updated when system 205 is in the field.

Compared to processor 210, processor 230 is a less power consuming processor. Thus by using processor 230 in lieu of processor 210 to monitor a subset of sensors 220 yields a power savings. If processor 210 were to constantly monitor sensors 220, the power savings may not be realized. In addition to the power savings realized by using processor 230 for monitoring the subset of sensors 220, bifurcating the processors also ensures that the safety monitoring and core alarming features of system 205 will operate regardless of whether processor 210 is functioning. By way of example and not by way of limitation, system processor 210 can include a relatively high-powered processor such as Freescale Semiconductor K60 Microcontroller, while safety processor 230 may comprise a relatively low-powered processor such as a Freescale Semiconductor KL 16 Microcontroller. Overall operation of hazard detection system 205 entails a judiciously architected cooperation of system processor 210 and safety processor 230, with system processor 210 performing selected higher-level, advanced functions that may not have been conventionally associated with hazard detection units (for example: more advanced user interface and communications functions; various computationally-intensive algorithms to sense patterns in user behavior or patterns in ambient conditions; algorithms for governing, for example, the brightness of an LED night light as a function of ambient brightness levels; algorithms for governing, for example, the sound level of an onboard speaker for home intercom functionality; algorithms for governing, for example, the issuance of voice commands to users; algorithms for uploading logged data to a central server; algorithms for establishing network membership; and so forth), and with safety processor 230 performing the more basic functions that may have been more conventionally associated with hazard detection units (e.g., smoke and CO monitoring, actuation of shrieking/buzzer alarms upon alarm detection). By way of example and not by way of limitation, system processor 210 may consume on the order of 18 mW when it is in a relatively high-power active state and performing one or more of its assigned advanced functionalities, whereas safety processor 230 may only consume on the order of 0.05 mW when it is performing its basic monitoring functionalities. However, again by way of example and not by way of limitation, system processor 210 may consume only on the order of 0.005 mW when in a relatively low-power inactive state, and the advanced functions that it performs are judiciously selected and timed such the system processor is in the relatively high power active state only about 0.05% of the time, and spends the rest of the time in the relatively low-power inactive state. Safety processor 230, while only requiring an average power draw of 0.05 mW when it is performing its basic monitoring functionalities, should of course be performing its basic monitoring functionalities 100% of the time. According to one or more embodiments, the judiciously architected functional overlay of system processor 210 and safety processor 230 is designed such that hazard detection system 205 can perform basic monitoring and shriek/buzzer alarming for hazard conditions even in the event that system processor 210 is inactivated or incapacitated, by virtue of the ongoing operation of safety processor 230. Therefore, while system processor 210 is configured and programmed to provide many different capabilities for making hazard detection unit 205 an appealing, desirable, updatable, easy-to-use, intelligent, network-connected sensing and communications node for enhancing the smart-home environment, its functionalities are advantageously provided in the sense of an overlay or adjunct to the core safety operations governed by safety processor 230, such that even in the event there are operational issues or problems with system processor 210 and its advanced functionalities, the underlying safety-related purpose and functionality of hazard detector 205 by virtue of the operation of safety processor 230 will continue on, with or without system processor 210 and its advanced functionalities.

High power wireless communications circuitry 212 can be, for example, a Wi-Fi module capable of communicating according to any of the 802.11 protocols. For example, circuitry 212 may be implemented using WiFi part number BCM43362, available from Murata. Depending on an operating mode of system 205, circuitry 212 can operate in a low power "sleep" state or a high power "active" state. For example, when system 205 is in an Idle mode, circuitry 212 can be in the "sleep" state. When system 205 is in a non-Idle mode such as a Wi-Fi update mode, software update mode, or alarm mode, circuitry 212 can be in an "active" state. For example, when system 205 is in an active alarm mode, high power circuitry 212 may communicate with router 222 so that a message can be sent to a remote server or device.

Low power wireless communications circuitry 214 can be a low power Wireless Personal Area Network (6LoWPAN) module or a ZigBee module capable of communicating according to a 802.15.4 protocol. In some embodiments, low power wireless communications circuitry 214 may serve as a node in a fabric network of devices. In another embodiment, circuitry 214 can be part number EM357 SoC available from Silicon Laboratories. Depending on the operating mode of system 205, circuitry 214 can operate in a relatively low power "sleep" state or a relatively high power "awake" state. When system 205 is in the Idle mode, WiFi update mode, or software update mode, circuitry 214 can be in the "sleep" state. Circuitry 214 may transition from the sleep state to the awake state in response to receipt of a wake packet (transmitted by another device) or in response to a state change in one of the state machines running on system 205. When system 205 is in the Alarm mode, circuitry 214 can transmit fabric messages so that the low power wireless communications circuitry in system 207 can receive data indicating that system 205 is alarming. Thus, even though it is possible for high power wireless communications circuitry 212 to be used for listening for alarm events, it can be more power efficient to use low power circuitry 214 for this purpose. Power savings may be further realized when several hazard detection systems or other systems having low power circuitry 214 form an interconnected wireless fabric network.

Power savings may also be realized because in order for low power circuitry 214 to continually listen for data transmitted from other low power circuitry, circuitry 214 may constantly be operating in its "sleep" state. This state consumes power, and although it may consume more power than high power circuitry 212 operating in its sleep state, the power saved versus having to periodically activate high power circuitry 214 can be substantial. When high power circuitry 212 is in its active state and low power circuitry 214 is in its awake state, high power circuitry 212 can consume substantially more power than low power circuitry 214.

In some embodiments, low power wireless communications circuitry 214 can be characterized by its relatively low power consumption and its ability to wirelessly communicate according to a first protocol characterized by relatively low data rates, and high power wireless communications circuitry 212 can be characterized by its relatively high power consumption and its ability to wirelessly communicate according to a second protocol characterized by relatively high data rates.

In some embodiments, low power wireless communications circuitry 214 may be a mesh network compatible module that does not require a distinguished access point in order to communicate to devices in a network. Mesh network compatibility can include provisions that enable mesh network compatible modules to keep track of other nearby mesh network compatible modules so that data can be passed through neighboring modules. Mesh network compatibility is essentially the hallmark of the 802.15.4 protocol. In contrast, high power wireless communications circuitry 212 is not a mesh network compatible module and requires an access point in order to communicate to devices in a network. Thus, if a first device having circuitry 212 wants to communicate data to another device having circuitry 212, the first device has to communicate with the access point, which then transmits the data to the second device. There is no device-to-device communication per se using circuitry 212.

Non-volatile memory 216 can be any suitable permanent memory storage such as, for example, NAND Flash, a hard disk drive, NOR, ROM, or phase change memory. In one embodiment, non-volatile memory 216 can store audio clips that can be played back by speaker 218. The audio clips can include installation instructions or warnings in one or more languages. Speaker 218 can be any suitable speaker operable to playback sounds or audio files. Speaker 218 can include an amplifier (not shown).

Sensors 220 can be monitored by system processor 210 and safety processor 230, and can include safety sensors 221 and non-safety sensors 222. One or more of sensors 220 may be exclusively monitored by one of system processor 210 and safety processor 230. As defined herein, monitoring a sensor refers to a processor's ability to acquire data from that monitored sensor. That is, one particular processor may be responsible for acquiring sensor data, and possibly storing it in a sensor log, but once the data is acquired, it can be made available to another processor either in the form of logged data or real-time data. For example, in one embodiment, system processor 210 may monitor one of non-safety sensors 222, but safety processor 230 cannot monitor that same non-safety sensor. In another embodiment, safety processor 230 may monitor each of the safety sensors 221, but may provide the acquired sensor data to system processor 210.

Safety sensors 221 can include sensors necessary for ensuring that hazard detection system 205 can monitor its environment for hazardous conditions and alert users when hazardous conditions are detected, and all other sensors not necessary for detecting a hazardous condition are non-safety sensors 222. In some embodiments, safety sensors 221 include only those sensors necessary for detecting a hazardous condition. For example, if the hazardous condition includes smoke and fire, then the safety sensors might only include a smoke sensor, at least one temperature sensor and a relative humidity sensor. Other sensors, such as non-safety sensors, could be included as part of system 205, but might not be needed to detect smoke or fire. As another example, if the hazardous condition includes carbon monoxide, then the safety sensor might be a carbon monoxide sensor, and no other sensor might be needed to perform this task.

Thus, sensors deemed necessary can vary based on the functionality and features of hazard detection system 205. In one embodiment, hazard detection system 205 can be a combination smoke, fire, and carbon monoxide alarm system. In such an embodiment, detection system 205 can include the following necessary safety sensors 221: a smoke detector, a carbon monoxide (CO) sensor, and one or more temperature sensors. Smoke detectors typically use optical detection, ionization, or air sampling techniques to trigger the smoke condition. Optical scattering and obscuration detection techniques may use infrared light emitting diodes (LEDs) and photodiodes. When smoke and/or other matter (e.g., water vapor) enters a smoke chamber, the light emitted by the LED(s) is scattered, which enables the photodiodes to detect the light. If no smoke or other matter (e.g., water vapor) is in the smoke chamber, then the photodiodes are not be able to detect the light being emitted by the LED(s). Ionization techniques may use a radioactive material such as Americium-241 to ionize the air, which creates a measurable current between detector two plates. When smoke particles enter the chamber, they bind to the ions. The reaction produces a measurable drop in the conducted current between detector plates; the resulting drop indicates smoke detection. In some geographic locations (e.g., Europe) traditional Americium-241 ionization smoke detectors are banned by regulatory agencies in part because of the necessity to dispose of a radioactive material at the end of the smoke detector's life. A smoke detector can also use a non-radioactive ionization technique to detect the presence of smoke and/or other particulate matter. A non-radioactive ionizing detector may use a LED such as an ultraviolet emitting LED with a photocatalyst coating. The photocatalyst generates ions when light (e.g., UV light) passes through it. When these ions are displaced or neutralized by smoke and/or other matter, the detector detects a change in current between two plates and register a smoke event.

A CO sensor can detect the presence of carbon monoxide gas, which, in the home, is typically generated by open flames, space heaters, water heaters, blocked chimneys, and automobiles. The material used in electrochemical CO sensors typically has a 5-7 year lifespan. Thus, after a 5-7 year period has expired, the CO sensor should be replaced. A heat sensor can be a thermistor, which is a type of resistor whose resistance varies based on temperature. Thermistors can include negative temperature coefficient (NTC) type thermistors or positive temperature coefficient (PTC) type thermistors. A relative humidity sensor may be used to distinguish between obscuration caused by smoke and steam or fog. Furthermore, in this embodiment, detection system 205 can include the following non-safety sensors 222: a humidity sensor, an ambient light sensor, a push-button sensor, a passive infra-red (PIR) sensor, and one or more ultrasonic sensors. A temperature and humidity sensor can provide relatively accurate readings of temperature and relative humidity for the purposes of environmental monitoring and HVAC control. An ambient light sensor (ALS) can detect ambient light and the push-button sensor can be a switch, for example, that detects a user's press of the switch. A PIR sensor can be used for various motion detection features. Ultrasonic sensors can be used to detect the presence of an object. Such sensors can generate high frequency sound waves and determine which wave(s) are received back by the sensor. Sensors 220 can be mounted to a printed circuit board (e.g., the same board that processors 210 and 230 may be mounted to), a flexible printed circuit board, a housing of system 205, or a combination thereof.

In some embodiments, data acquired from one or more non-safety sensors 222 can be acquired by the same processor used to acquire data from one or more safety sensors 221. For example, safety processor 230 may be operative to monitor both safety and non-safety sensors 221 and 222 for power savings reasons, as discussed above. Although safety processor 230 may not need any of the data acquired from non-safety sensor 222 to perform its hazard monitoring and alerting functions, the non-safety sensor data can be utilized to provide enhanced hazard system 205 functionality. The enhanced functionality can be realized in alarming algorithms according to various embodiments discussed herein. For example, the non-sensor data can be utilized by system processor 210 to implement system state machines that may interface with one or more sensor state machines, all of which are discussed in more detail below in connection with the description accompanying FIG. 3 and in U.S. Provisional Application No. 61/847,937.

Alarm 234 can be any suitable alarm that alerts users in the vicinity of system 205 of the presence of a hazard condition. Alarm 234 can also be activated during testing scenarios. Alarm 234 can be a piezo-electric buzzer, for example.

Power source 240 can supply power to enable operation of system 205 and can include any suitable source of energy. Embodiments discussed herein can include AC line powered, battery powered, a combination of AC line powered with a battery backup, and externally supplied DC power (e.g., USB supplied power). Embodiments that use AC line power, AC line power with battery backup, or externally supplied DC power may be subject to different power conservation constraints than battery only embodiments. Battery powered embodiments are designed to manage power consumption of its finite energy supply such that hazard detection system 205 operates for a minimum period of time. In some embodiments, the minimum period of time can be one (1) year, three (3) years, or seven (7) years. In other embodiments, the minimum period of time can be at least seven (7) years, eight (8) years, nine (9) years, or ten (10) years. Line powered embodiments are not as constrained because their energy supply is virtually unlimited. Line powered with battery backup embodiments may employ power conservation methods to prolong the life of the backup battery.

In battery only embodiments, power source 240 includes one or more batteries or a battery pack. The batteries can be constructed from different compositions (e.g., alkaline or lithium iron disulfide) and different end-user configurations (e.g., permanent, user replaceable, or non-user replaceable) can be used. In one embodiment, six cells of Li—FeS$_2$ can be arranged in two stacks of three. Such an arrangement can yield about 27000 mWh of total available power for system 205.

Power conversion circuitry 242 includes circuitry that converts power from one level to another. Multiple instances of power conversion circuitry 242 may be used to provide the different power levels needed for the components within system 205. One or more instances of power conversion circuitry 242 can be operative to convert a signal supplied by power source 240 to a different signal. Such instances of power conversion circuitry 242 can exist in the form of buck converters or boost converters. For example, alarm 234 may require a higher operating voltage than high power wireless communications circuitry 212, which may require a higher operating voltage than processor 210, such that all required voltages are different than the voltage supplied by power source 240. Thus, as can be appreciated in this example, at least three different instances of power conversion circuitry 242 are required.

High quality power circuitry 243 is operative to condition a signal supplied from a particular instance of power conversion circuitry 242 (e.g., a buck converter) to another signal. High quality power circuitry 243 may exist in the form of a low-dropout regulator. The low-dropout regulator may be able to provide a higher quality signal than that provided by power conversion circuitry 242. Thus, certain components may be provided with "higher" quality power than other components. For example, certain safety sensors 221 such as smoke detectors and CO sensors require a more stable voltage in order to operate properly than a digital circuitry within the system processor 210.

Power gating circuitry 244 can be used to selectively couple and de-couple components from a power bus. De-coupling a component from a power bus insures that the component does not incur any quiescent current loss, and therefore can extend battery life beyond that which it would be if the component were not so de-coupled from the power bus. Power gating circuitry 244 can be a switch such as, for example, a MOSFET transistor. Even though a component is de-coupled from a power bus and does not incur any current loss, power gating circuitry 244 itself may consume a small amount of power. This power consumption, however, is less than the quiescent power loss of the component.

It is understood that although hazard detection system 205 is described as having two separate processors, system processor 210 and safety processor 230, which may provide certain advantages as described hereinabove and hereinbelow, including advantages with regard to power consumption as well as with regard to survivability of core safety monitoring and alarming in the event of advanced feature provision issues, it is not outside the scope of the present teachings for one or more of the various embodiments discussed herein to be executed by one processor or by more than two processors.

Figure 3:
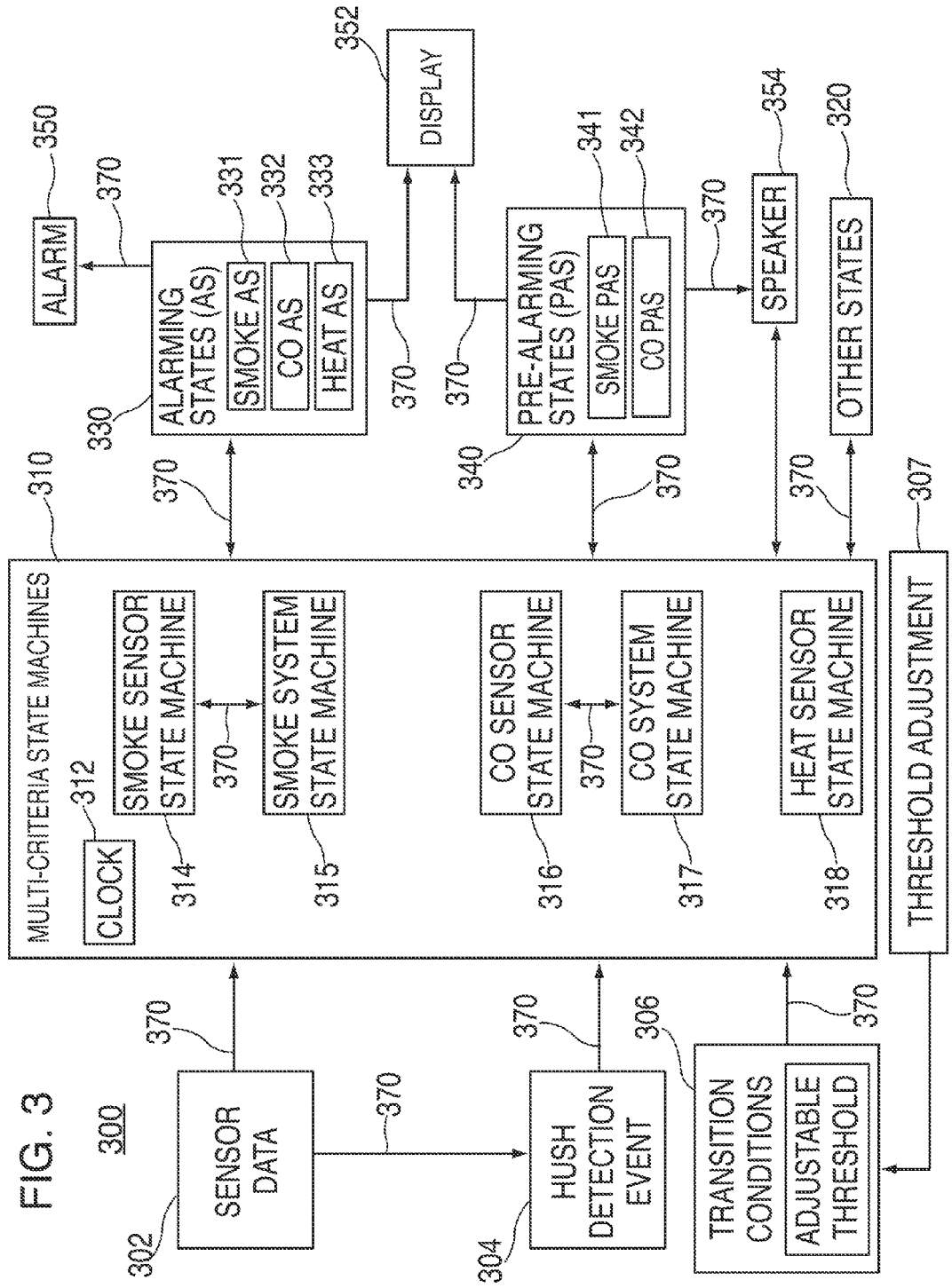
FIG. 3 shows an illustrative block diagram showing various components of a hazard detection system working together to provide multi-criteria alarming and pre-alarming functionality, according to some embodiments.

FIG. 3 shows an illustrative block diagram showing various components of hazard detection system 300 working together to provide multi-criteria alarming and pre-alarming functionalities according to various embodiments. As shown, system 300 can include sensor data 302, hush detection events 304, transition conditions 306, threshold adjustment parameter 307, multi-criteria state machines 310, clock 312, other states 320, alarming states 330, pre-alarming states 340, alarm 350, display 352, and speaker 354. Also shown are several communication links 370, each of which may have unidirectional or bidirectional data and/or signal communications capabilities. Multi-criteria state machines 310 can control alarming states 330, pre-alarming states 340, and all other state machine states 320 based on sensor data 302, hush detection events 304, transition conditions 306, clock 312, and other criteria, and alarming and pre-alarming states 330 and 340 can control the output of alarm 350, display 352, and speaker 354. Alarming states 330 can include multiple alarming states (e.g., one for each hazard, such as smoke alarming state 331, CO alarming state 332, and heat alarming state 333) and pre-alarming states 340 can include multiple pre-alarming states (e.g., one or more for each hazard, such as smoke pre-alarming state 341 and CO pre-alarming state 342. Other states can include, for example, idling states, monitoring states, alarm hushing states, pre-alarm hushing states, post-alarm states, holding states, and alarm monitoring states.

Alarming states 330 can control activation and deactivation of alarm 350 and display 352 in response to determinations made by multi-criteria state machines 310. Alarm 350 can provide audible cues (e.g., in the form of buzzer beeps) that a dangerous condition is present. Display 352 can provide a visual cue (e.g., such as flashing light or change in color) that a dangerous condition is present. If desired, alarming states 330 can control playback of messages over speaker 354 in conjunction with the audible and/or visual cues. For example, combined usage of alarm 350 and speaker 354 can repeat the following sequence: "BEEP, BEEP, BEEP—Smoke Detected In Bedroom—

BEEP BEEP BEEP," where the "BEEPS" emanate from alarm 350 and "smoke detected in bedroom" emanates from speaker 354. As another example, usage of alarm 350 and speaker 354 can repeat the following sequence: "BEEP, BEEP, BEEP—Wave to Hush Alarm—BEEP BEEP BEEP," in which speaker 354 is used to provide alarming hush instructions. Any one of the alarming states 330 (e.g., smoke alarm state 331, CO alarm state 332, and heat alarm state 333) can independently control alarm 350 and/or display 352 and/or speaker 354. In some embodiments, alarming states 330 can cause alarm 350 or display 352 or speaker 354 to emit different cues based on which specific alarm state is active. For example, if a smoke alarm state is active, alarm 350 may emit a sound having a first characteristic, but if a CO alarm state is active, alarm 350 may emit a sound having a second characteristic. In other embodiments, alarming states 330 can cause alarm 350 and display 352 and speaker 354 to emit the same cue regardless of which specific alarm state is active.

Pre-alarming states 340 can control activation and deactivation of speaker 354 and display 352 in response to determinations made by multi-criteria state machines 310. Pre-alarming can serve as a warning that a dangerous condition may be imminent. Speaker 354 may be utilized to playback voice warnings that a dangerous condition may be imminent. Different pre-alarm messages may be played back over speaker 354 for each type of detected pre-alarm event. For example, if a smoke pre-alarm state is active, a smoke related message may be played back over speaker 354. If a CO pre-alarm state is active, a CO related message may be played back. Furthermore, different messages may be played back for each one of the multiple pre-alarms associated with each hazard (e.g., smoke and CO). For example, the smoke hazard may have two associated pre-alarms, one associated with a first smoke pre-alarming state (e.g., suggesting that an alarming state may be moderately imminent) and another one associated with a second smoke pre-alarming state (e.g., suggesting that an alarming state may be highly imminent). Pre-alarm messages may also include voice instructions on how to hush pre-alarm messages. Display 352 may also be utilized in a similar fashion to provide visual cues of an imminent alarming state. In some embodiments, the pre-alarm messages can specify the location of the pre-alarming conditions. For example, if hazard system 300 knows it is located in the bedroom, it can incorporate the location in the pre-alarm message: "Smoke Detected In Bedroom."

Hazard detection system 300 can enforce alarm and pre-alarm priorities depending on which conditions are present. For example, if elevated smoke and CO conditions exist at the same time, the smoke alarm state and/or pre-alarm smoke state may take precedence over the CO alarm state and/or CO pre-alarm state. If a user silences the smoke alarm or smoke pre-alarm, and the CO alarm state or CO pre-alarm state is still active, system 300 may provide an indication (e.g., a voice notification) that a CO alarm or pre-alarm has also been silenced. If a smoke condition ends and the CO alarm or pre-alarm is event is still active, the CO alarm or pre-alarm may be presented to the user.

Multi-criteria state machines 310 can transition to an idling state when it determines that relatively little or no dangerous conditions exist. The idling state can enforce a relatively low level of hazard detection system activity. For example, in the idle state, the data sampling rates of one or more sensors may be set at relatively slow intervals. Multi-criteria state machines 310 can transition to a monitoring state when it determines that sensor data values have raised to a level that warrants closer scrutiny, but not to a level that transitions to a pre-alarming or alarming state. The monitoring state can imply a relatively high level of hazard detection system activity. For example, in monitoring state, the data sampling rates of one or more sensors may be much greater than in the idle state. In addition, the data sampling rates of one or more sensors may be set at relatively fast intervals for alarming states 330, pre-alarming states 340, or both.

Alarm hushing and pre-alarm hushing states may refer to a user-instructed deactivation of an alarm or a pre-alarm for a predetermined amount of time. For example, in one embodiment, a user can press a button (not shown) to silence an alarm or pre-alarm. In another embodiment, a user can perform a hush gesture in the presence of the hazard detection system. A hush gesture can be a user initiated action in which he or she performs a gesture (e.g., a wave motion) in the vicinity of system 300 with the intent to turn off or silence a blaring alarm. One or more ultrasonic sensors, a PIR sensor, or a combination thereof can be used to detect this gesture. The gesture hush feature and systems and methods for detecting and processing the gesture hush feature are discussed in more detail in U.S. Provisional Patent Application Nos. 61/847,960 and 61/889,013.

Post-alarming states may refer to states that multi-criteria state machines 310 can transition to after having been in one of alarming states 330 or one of pre-alarming states 340. In one post-alarming state, hazard detection system 300 can provide an "all clear" message to indicate that the alarm or pre-alarm condition is no longer present. This can be especially useful, for example, for CO because humans cannot detect CO. Another post-alarming state can be a holding state, which can serve as a system debounce state. This state can prevent hazard detection system 300 from immediately transitioning back to a pre-alarming state 340 after having just transitioned from an alarming state 330.

Multi-criteria state machines 310 can include several different state machines: sensor state machines and system state machines. Each state machine can be associated with a particular hazard such as, for example, a smoke hazard, a carbon monoxide hazard, or a heat hazard, and the multi-criteria state machines may leverage data acquired by one or more sensors in managing detection of a hazard. In some embodiments, a sensor state machine can be implemented for each hazard. In other embodiments, a system state machine may be implemented for each hazard or a subset of hazards. The sensor state machines can be responsible for controlling relatively basic hazard detection system functions and the system state machines can be responsible for controlling relatively advanced hazard detection system functions. In managing detection of a hazard, each sensor state machine and each system state machine can transition among any one of its states based on sensor data 302, hush events 304, and transition conditions 306. A hush event can be a user initiated command to hush, for example, a sounding alarm or pre-alarm voice instruction.

Transition conditions 306 can include a myriad of different conditions that may define how a state machine transitions from one state to another. Each state machine can have its own set of transition conditions, and examples of state machine specific transition conditions can be found in U.S. Provisional Application No. 61/847,937. The conditions can define thresholds that may be compared against any one or more of the following inputs: sensor data values, time clocks, and user interaction events (e.g., hush events). State change transitions can be governed by relatively simple conditions (e.g., single-criteria conditions), or relatively complex conditions (e.g., multi-criteria conditions). Single-criteria conditions may compare one input to one threshold.

For example, a simple condition can be a comparison between a sensor data value and a threshold. If the sensor data value equals or exceeds the threshold, the state change transition may be executed. In contrast, a multi-criteria condition can be a comparison of one or more inputs to one or more thresholds. For example, a multi-criteria condition can be a comparison between a first sensor value and a first threshold and a comparison between a second sensor value and a second threshold. In some embodiments, both comparisons would need to be satisfied in order to effect a state change transition. In other embodiments, only one of the comparisons would need to be satisfied in order to effect a state change transition. As another example, a multi-criteria condition can be a comparison between a time clock and a time threshold and a comparison between a sensor value and a threshold.

In some embodiments, the threshold for a particular transition condition can be adjusted. Such thresholds are referred to herein as adjustable thresholds (e.g., shown as part of transition conditions 306). The adjustable threshold can be changed in response to threshold adjustment parameter 307, which may be provided, for example, by an alarm threshold setting module according to an embodiment. Adjustable thresholds can be selected from one of at least two different selectable thresholds, and any suitable selection criteria can be used to select the appropriate threshold for the adjustable threshold. In one embodiment, the selection criteria can include several single-criteria conditions or a multi-criteria condition. In another embodiment, if the adjustable threshold is compared to sensor values of a first sensor, the selection criteria can include an analysis of at least one sensor other than the first sensor. In another embodiment, the adjustable threshold can be the threshold used in a smoke alarm transition condition, and the adjustable threshold can be selected from one of three different thresholds.

In some embodiments, the threshold for a particular transition condition can be a learned condition threshold (not shown). The learned condition threshold can be the result of a difference function, which may subtract a constant from an initial threshold. The constant can be changed, if desired, based on any suitable number of criteria, including, for example, heuristics, field report data, software updates, user preferences, device settings, etc. Changing the constant can provide a mechanism for changing the transition condition for one or more states (e.g., a pre-alarming state). This constant can be provided to transition conditions 306 to make adjustments to the learned condition threshold. In one embodiment, the constant can be selected based on installation and setup of hazard detection system 300. For example, the home owner can indicate that hazard detection system 300 has been installed in a particular room of an enclosure. Depending on which room it is, system 300 can select an appropriate constant. For example, a first constant can be selected if the room is a bedroom and a second constant can be selected if the room is a kitchen. The first constant may be a value that makes hazard detection system 300 more sensitive to potential hazards than the second constant because the bedroom is in a location that is generally further away from an exit and/or is not generally susceptible to factors that may otherwise cause a false alarm. In contrast, the kitchen, for example, is generally closer to an exit than a bedroom and can generate conditions (e.g., steam or smoke from cooking) that may cause a false alarm. Other installation factors can also be taken into account in selecting the appropriate constant. For example, the home owner can specify that the room is adjacent to a bathroom. Since humidity stemming from a bathroom can cause false alarms, hazard system 300 can select a constant that takes this into account. As another example, the home owner can specify that the room includes a fireplace. Similarly, hazard system 300 can select a constant that takes this factor into account.

In another embodiment, hazard detection system 300 can apply heuristics to self-adjust the constant. For example, conditions may persist that keep triggering pre-alarms, but the conditions do not rise to alarming levels. In response to such persistent pre-alarm triggering, hazard detection system 300 can modify the constant so that the pre-alarms are not so easily triggered. In yet another embodiment, the constant can be changed in response to a software update. For example, a remote server may analyze data acquired from several other hazard detection systems and adjust the constant accordingly, and push the new constant to hazard detection system 300 via a software update. In addition, the remote server can also push down constants based on user settings or user preferences to hazard detection system 300. For example, the home owner may be able to define a limited number of settings by directly interacting with hazard detection system 300. However, the home owner may be able to define an unlimited number of settings by interacting with, for example, a web-based program hosted by the remote server. Based on the settings, the remote server can push down one or more appropriate constants.

The sensor state machines can control alarming states 330 and one or more of other states 320. In particular, smoke sensor state machine 314 can control smoke alarm state 331, CO sensor state machine 316 can control CO alarming state 332, and heat sensor state machine 318 can control heat alarming state 333. For example, smoke sensor state machine 314 may be operative to sound alarm 350 in response to a detected smoke event. As another example, CO sensor state machine 316 can sound alarm 350 in response to a detected CO event. As yet another example, heat sensor state machine 318 can sound alarm 350 in response to a detected heat event. In some embodiments, a sensor state machine can exercise exclusive control over one or more alarming states 330.

The system state machines can control pre-alarming states 340 and one or more of other states 320. In particular, smoke system state machine 315 may control smoke pre-alarm state 341, and CO system state machine 317 may control CO pre-alarm state 342. In some embodiments, each system state machine can manage multiple pre-alarm states. For example, a first pre-alarm state may warn a user that an abnormal condition exists, and a second pre-alarm state may warn the user that the abnormal condition continues to exist. Moreover, each system state machine can manage other states that cannot be managed by the sensor state machines. For example, these other states can include a monitoring state, a pre-alarm hushing state, and post-alarm states such as holding and alarm monitoring states.

The system state machines can co-manage one or more states with sensor state machines. These co-managed states ("shared states") can exist as states in both system and sensor state machines for a particular hazard. For example, smoke system state machine 315 may share one or more states with smoke sensor state machine 314, and CO system state machine 317 may share one or more states with CO sensor state machine 316. The joint collaboration between system and sensor state machines for a particular hazard is shown by communications link 370, which connects the two state machines. In some embodiments, any state change transition to a shared state may be controlled by the sensor state machine. For example, the alarming state may be a shared state, and anytime a sensor state machine transitions to the alarming state, the system state machine that co-manages states with that sensor state machine may also transition to the alarming state. In some embodiments, shared states can include idling states, alarming states, and alarm hushing states. The parameters by which multi-criteria state machines 310 may function are discussed in more detail in connection with the description accompanying FIGS. 4A-8B of U.S. Provisional Patent Application No. 61/847,937.

Figure 4:
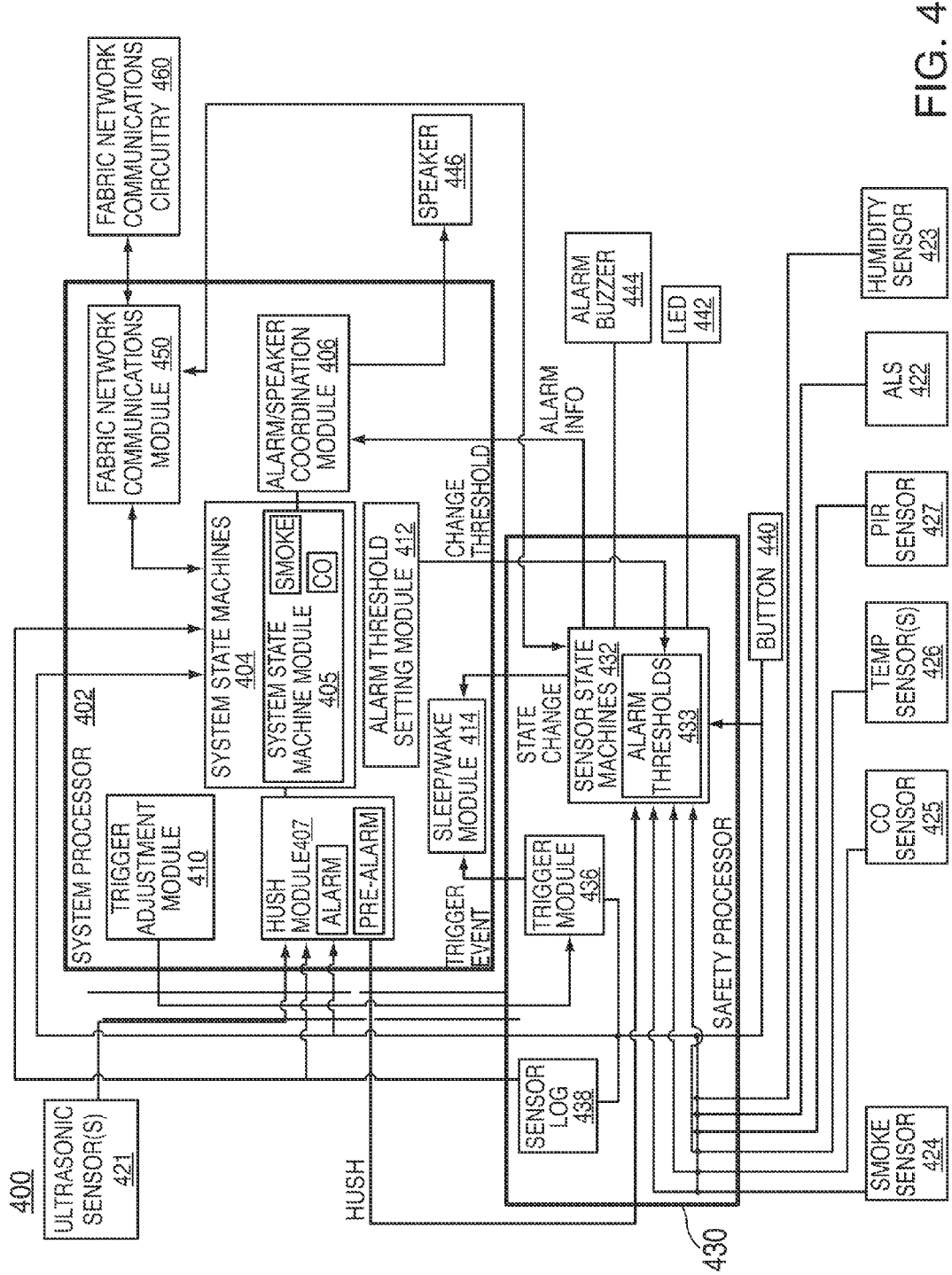
FIG. 4 shows an illustrative schematic of a hazard detection system, according to some embodiments.

FIG. 4 shows an illustrative schematic of hazard detection system 400 according to an embodiment and shows, among other things, signal paths among various components, state machines, and illustrative modules being executed by different processors. System 400 can include system processor 402, safety processor 430, ultrasonic sensors 421, ALS sensor 422, humidity sensor 423, smoke sensor 424, CO sensor 425, temperatures sensors 426, and PIR sensor 427, button 440, LED(s) 442, alarm 444, speaker 446, fabric network communications module 450, and fabric network communications circuitry 460. System processor 402 can be similar to system processor 210 of FIG. 2. System processor 402 can operate system state machines 404 system state machine module 405, alarm/speaker coordination module 406, hush module 407, trigger adjustment module 410, and sleep/wake module 414. System state machines 404 can access system state machine module 405, alarm/speaker coordination module 406, and hush module 407 in making state change determinations. System processor 402 can receive data values acquired by ultrasonic sensors 421 and other inputs from safety processor 430. System processor 402 may receive data from sensors 422-427, data from sensor log 438, trigger events from trigger module 436, state change events and alarm information from sensor state machines 432, and button press events from button 440.

Safety processor 430 can be similar to safety processor 230 of FIG. 2. Safety processor 430 can operate sensor state machines 432, alarm thresholds 433, trigger module 436, and sensor log 438. Safety processor 430 can control operation of LEDs 442 and alarm 444. Safety processor 430 can receive data values acquired by sensors 422-427 and button 440. All or a portion of acquired sensor data can be provided to sensor state machines 432. For example, as illustrated in FIG. 4, smoke, CO, and heat sensor data is shown being directly provided to sensor state machines 432. Sensor log 438 can store chunks of acquired data that can be provided to system processor 402 on a periodic basis or in response to an event such as a state change in one of sensor state machines 432 or a trigger event detected by trigger module 436. In addition, in some embodiments, even though the sensor data may be stored in sensor log 438, it can also be provided directly to system processor 402, as shown in FIG. 4.

Alarm thresholds 433 can store the alarming thresholds in a memory (e.g., Flash memory) that is accessible by sensor state machines 432. As discussed above, sensor state machines 432 can compare monitored sensor data values against alarm thresholds 433 that may be stored within safety processor 430 to determine whether a hazard event exists, and upon determining that the hazard event exists, may cause the alarm to sound. Each sensor (e.g., smoke sensor, CO sensor, and heat sensor) may have one or more alarm thresholds. When multiple alarm thresholds are available for a sensor, safety processor 430 may initially select a default alarm threshold, but responsive to an instruction received from system processor 402 (e.g., from Alarm/Pre-Alarm Threshold Setting Module 412), it can select one of the multiple alarm thresholds as the alarm threshold for that sensor. Safety processor 430 may automatically revert back to the default alarm threshold if certain conditions are not met (e.g., a predetermined period of time elapses in which an alarm setting threshold instruction is not received from system processor 402).

Safety processor 430 and/or system processor 402 can monitor button 440 for button press events. Button 440 can be an externally accessible button that can be depressed by a user. For example, a user may press button 440 to test the alarming function or to hush an alarm. Safety processor 430 can control the operation of alarm 444 and LEDs 442. Processor 430 can provide alarm information to alarm/speaker coordination module 406 so that module 406 can coordinate speaker voice notification with alarm sounds. In some embodiments, safety processor 430 is the only processor that controls alarm 444. Safety processor 430 can also receive inputs from system processor 402 such as hush events from hush module 407, trigger band boundary adjustment instructions from trigger adjustment module 410, and change threshold instructions from alarm/pre-alarm threshold setting module 412.

As shown, hazard detection system 400 may use a bifurcated processor arrangement to execute the multi-criteria state machines to control the alarming and pre-alarming states, according to various embodiments. The system state machines can be executed by system processor 402 and the sensor state machines can be executed by safety processor 430. As shown, sensor state machines 432 may reside within safety processor 430. This shows that safety processor 430 can operate sensor state machines such as a smoke sensor state machine, CO sensor state machine, and heat sensor state machine. Thus, the functionality of the sensor state machines (as discussed above) are embodied and executed by safety processor 430. As also shown, system state machines 404 may reside within system processor 402. This shows that system processor 402 can operate system state machines such as a smoke system state machine and a CO system state machine. Thus, the functionality of the system state machines (as discussed above) are embodied and executed by system processor 402.

In the bifurcated approach, safety processor 430 can serve as the "brain stem" of hazard detection system 400 and system processor 402 can serve as the "frontal cortex." In human terms, even when a person goes to sleep (i.e., the frontal cortex is sleeping) the brain stem maintains basic life functions such as breathing and heart beating. Comparatively speaking, safety processor 430 is always awake and operating; it is constantly monitoring one or more of sensors 422-427, even if system processor 402 is asleep or non-functioning, and managing the sensor state machines of hazard detection system 400. When the person is awake, the frontal cortex is used to processes higher order functions such as thinking and speaking Comparatively speaking, system processor 402 performs higher order functions implemented by system state machines 404, alarm/speaker coordination module 406, hush module 407, trigger adjustment module 410, and alarm/pre-alarm threshold setting module 412. In some embodiments, safety processor 430 can operate autonomously and independently of system processor 402. Thus, in the event system processor 402 is not functioning (e.g., due to low power or other cause), safety processor 430 can still perform its hazard detection and alarming functionality.

The bifurcated processor arrangement may further enable hazard detection system 400 to minimize power consumption by enabling the relatively high power consuming system processor 402 to transition between sleep and non-sleep states while the relatively low power consuming safety processor 430 is maintained in a non-sleep state. To save power, system processor 402 can be kept in the sleep state until one of any number of suitable events occurs that wakes up system processor 402. Sleep/wake module 414 can control the sleep and non-sleep states of system processor 402. Safety processor 430 can instruct sleep/wake module 414 to wake system processor 402 in response to a trigger event (e.g., as detected by trigger module 436) or a state change in sensor state machines 432. Trigger events can occur when a data value associated with a sensor moves out of a trigger band associated with that sensor. A trigger band can define upper and lower boundaries of data values for each sensor and are stored with safety processor 430 in trigger module 436. Trigger module 436 can monitor sensor data values and compare them against the boundaries set for that particular sensor's trigger band. Thus, when a sensor data value moves out of band, trigger module 436 registers this as a trigger event and notifies system processor 402 of the trigger event (e.g., by sending a signal to sleep/wake module 414).

The boundaries of the trigger band can be adjusted by system processor 402, when it is awake, based on an operational state of hazard detection system 400. The operational state can include the states of each of the system and sensor state machines, sensor data values, and other factors. System processor 402 may adjust the boundaries of one or more trigger bands to align with one or more system state machine states before transitioning back to sleep. Thus, by adjusting the boundaries of one or more trigger bands, system processor 402 effectively communicates "wake me" instructions to safety processor 430. The "wake me" instructions can be generated by trigger adjustment module 410 and transmitted to trigger module 436, as shown in FIG. 4. The "wake me" instructions can cause module 436 to adjust a boundary of one or more trigger bands.

Fabric network communications module 450 may be operative to control a fabric network activation process and dissemination of fabric messages according to various embodiments. Module 450 can communicate with state machines 404 and 432 and with fabric network communications circuitry 460. Module 450 may generate the wake packets and fabric messages that are broadcasted by communications circuitry 460. Fabric network communications circuitry 460 may be operative to broadcast and receive data (including wake packets and fabric messages. In one embodiment, circuitry 460 can be similar to low power circuitry 214 of FIG. 2. Although not shown in FIG. 4, communications circuitry 460 can optionally communicate directly with safety processor 430.

Figure 5:
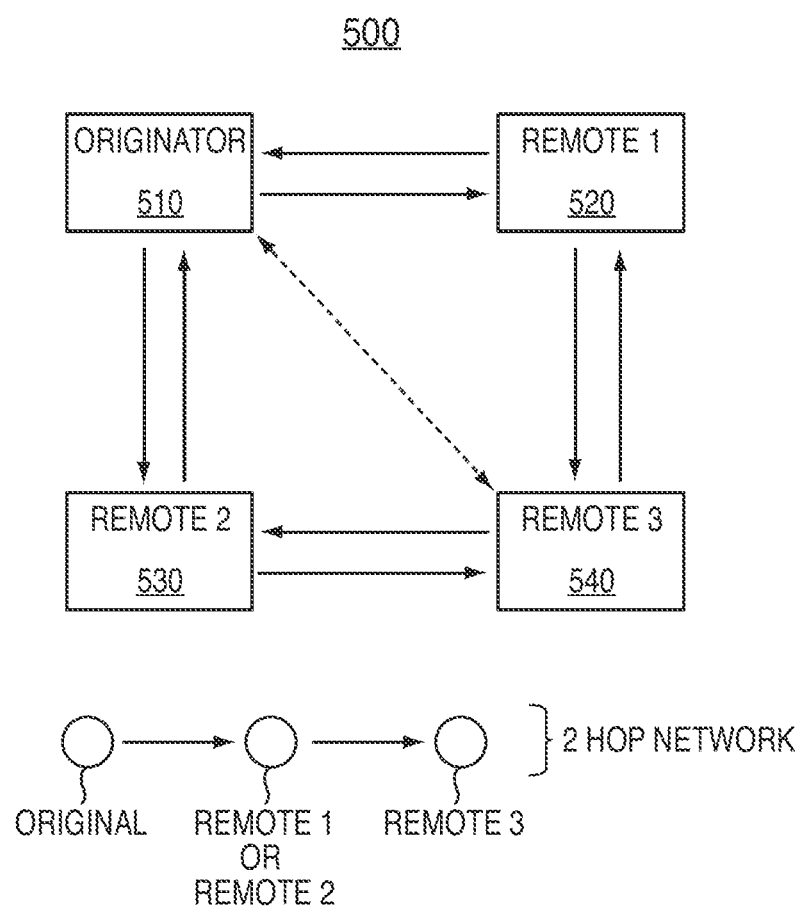
FIG. 5 shows an illustrative schematic of fabric network, according to an embodiment.

FIG. 5 shows an illustrative schematic of fabric network 500 according to an embodiment. Fabric network 500 can include two or more devices capable of wirelessly communicating with each other using one or more different communications protocols. The communications protocols can include, for example, Internet Protocol version 6 (IPv6). The devices of network 500 may be positioned throughout an enclosure, for example, such as a house or building. Depending on the positioning of the devices within the structure and interference elements existing therein, some devices may not be able to directly communicate with each other. For example, as shown in FIG. 5, device 510 can communicate directly with devices 520 and 530 (as indicated by the solid lines), but may not communicate directly with device 540 (as indicated by the dashed line). Device 510 may indirectly communicate with device 540 via either device 520 or 530 because devices 520 and 530 may communicate directly with device 540 (as shown by the solid lines).

Fabric network 500 may represent a multi-hop network in which at least one device serves as a retransmission station for relaying a message received from an originator device to a destination device because the originator and destination devices are not able to directly communicate with each other. The number of hops needed may depend on a number of factors such as the size of the network, the ability of device to communicate with each other, etc. Fabric network 500 may represent a two-hop network: the first hop exists between device 510 and device 520 or device 530, and the second hop exists between device 520 or 530 and device 540. If, for example, devices 510 and 540 could directly communicate with other, then fabric network 500 would be a single-hop network.

Devices 510, 520, 530, and 540 have been labeled as Originator, Remote 1 (R1), Remote 2 (R2), and Remote 3 (R3). These designations may be referred to herein throughout to indicate which device serves as an originator of a communication and which devices serve as recipients of the originator's message. The originator, as its name implies, is the device that initiates a fabric communication in response to conditions it is monitoring, and messages broadcasted by the originator are distributed to remote devices so that the remote devices can take the appropriate actions in response to the message broadcasted by the originator. The remote devices may transmit messages in response to the originator's message(s), but the originator decides whether to abide by the remote device's message. For example, the originator initiates a fabric communication by informing the remote devices that it is experiencing a smoke alarm. In response to receiving the smoke alarm message, the remote devices take an appropriate action (e.g., provide audible cues that a smoke alarm exists or start sounding an alarm). A remote device may broadcast a request to hush the alarm. The originator device, upon receiving the request, determines whether to hush the alarm. If hush conditions are satisfied, the originator may broadcast a new message that contains a hush instruction. It should be understood that the remote devices do not always blindly follow the originator device. For example, there may be instances where an originator device broadcast an "all clear" message (signifying that no conditions exist at the originator device), but one of the remote devices may be independently detecting an alarm condition. That remote device would not cease alarming or change its operational state in response to the originator's message, but it may acknowledge that the originator is "all clear".

As will be explained in more detail below, a fabric communication may include two parts: 1) waking up devices in the network and 2) transmitting a message after the devices have been woken up. If the devices in the fabric network have already been woken up, then the fabric communication may only include part 2, the transmission of a message. Devices within a fabric network may need to be woken up because they spend a majority of their operational life in a low-power, sleep mode.

Figure 6:
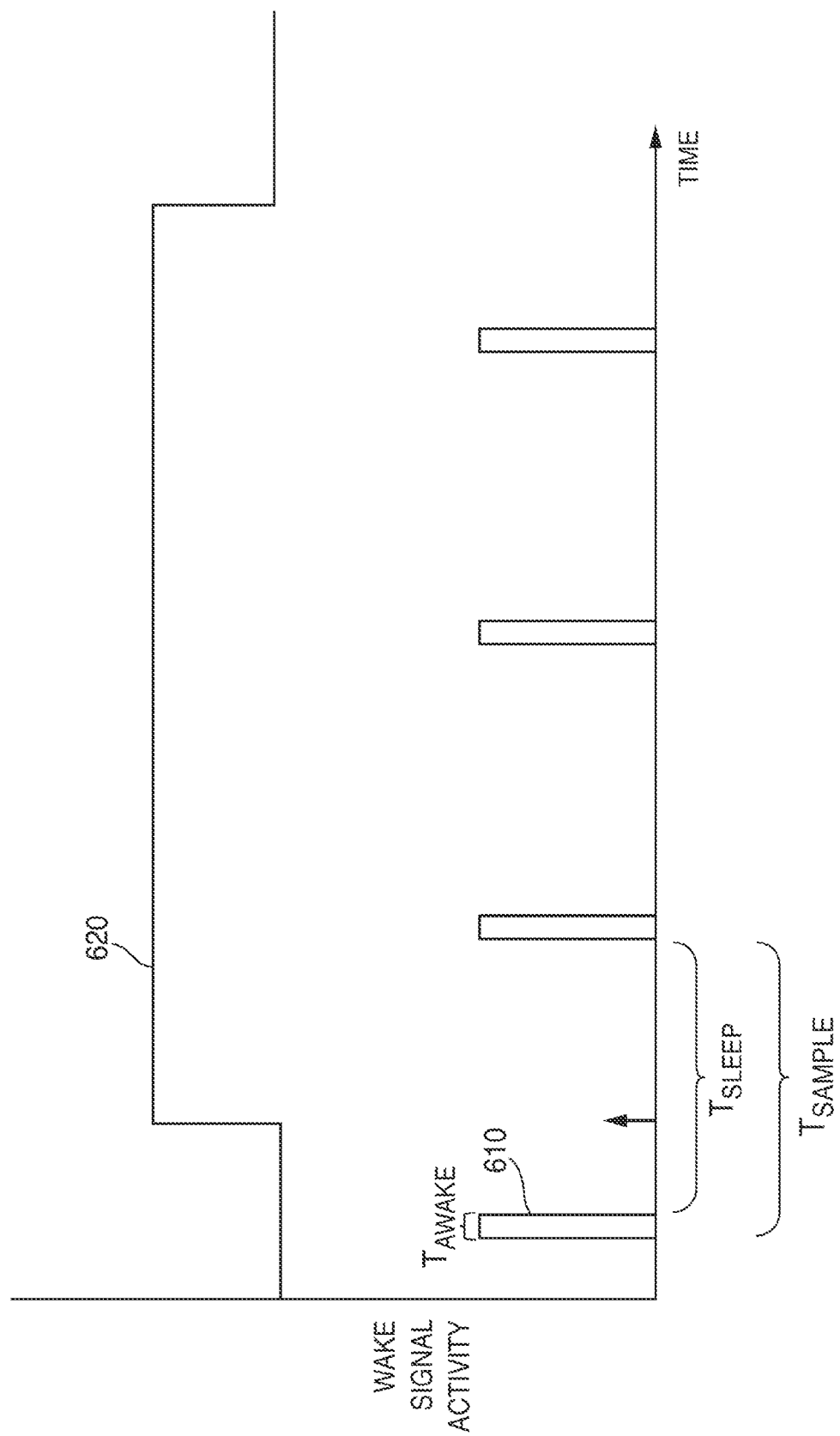
FIG. 6 shows illustrative timing diagrams, according to an embodiment.

FIG. 6 shows illustrative timing diagrams according to an embodiment. In particular, FIG. 6 shows sleep cycle waveform 610 of a device (e.g., any one of devices 510, 520, 530, or 540) and total wake signal waveform 620. Waveform 610 has period, $T_{SAMPLE}$, which includes an awake portion ($T_{Awake}$) and a sleep portion ($T_{Sleep}$). Thus, for each period, the device temporarily wakes up to check whether there is an ongoing wake activity in the fabric. Each device operating within a fabric network may operate according to waveform 610. When an originator device is instructed to wake up other devices in the network, the originator device may broadcast its wake signal message for the length of total wake signal waveform 620 to provide sufficient time for the wake signal to propagate through the fabric network to wake one or more devices within the network. The wake signal is designed to terminate at the same time across the network, and at the end of the wake signal all the devices across the fabric must be awake with high probability. To ensure these properties, the time duration of total wake signal waveform 620 must exceed the product of the number of hops in the fabric network and $T_{SAMPLE}$.

Figure 7:
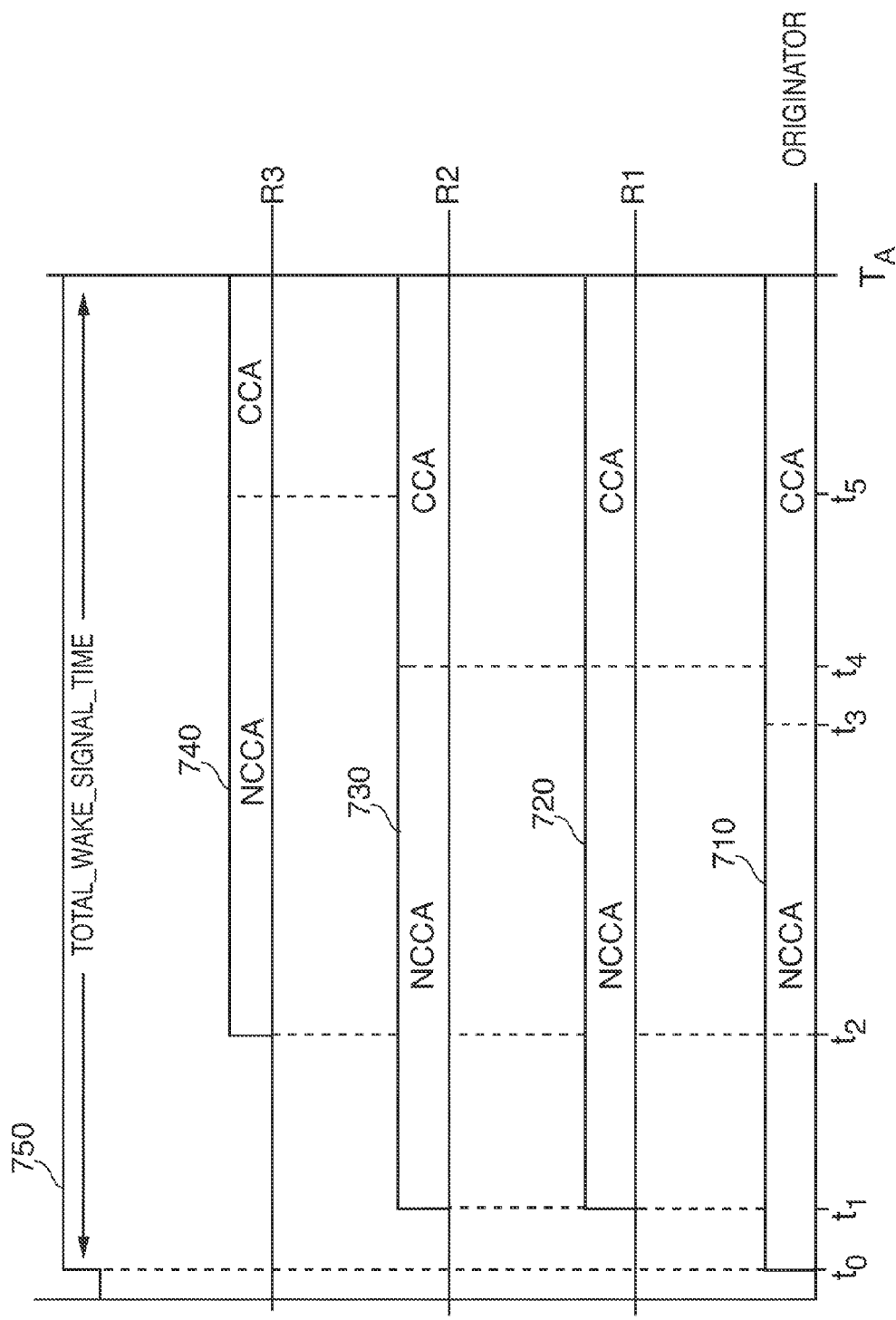
FIG. 7 shows illustrative wake signal waveforms for each device of FIG. 5, according to an embodiment.

FIG. 7 shows illustrative wake signal waveforms for each device of FIG. 5 according to an embodiment. As shown, waveforms 710, 720, 730, and 740 may correspond to the wake signal broadcasted by devices 510, 520, 530, and 540, respectively. Multiple wake packets (such as that shown and described in FIG. 8) may be broadcasted by a device during assertion of the wake signal. FIG. 7 also shows an illustrative total wake signal waveform 750, which has total wake signal time period, $T_{total\_wake\_signal\_time}$, beginning at time, $t_0$, and ending at time, $T_A$.

Figure 8:
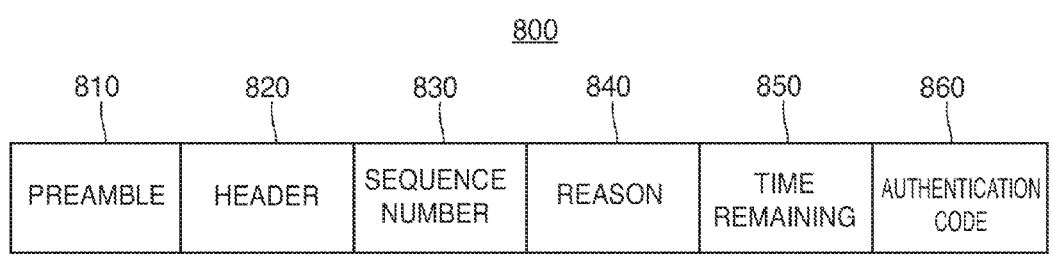
FIG. 8 shows an illustrative wake packet including several fields, according to an embodiment.

FIG. 8 shows an illustrative wake packet 800 including several fields according to an embodiment. As shown, wake packet 800 may include preamble field 810, header field 820, sequence number field 830, reason field 840, time remaining field 850, and authentication code field 860. Wake packet 800 may include additional fields (not shown). Preamble and header fields 810 and 820 may contain information pertaining to the identification and organization of the packet. Sequence number field 830 may specify a sequence number that is globally unique across the fabric network for the lifetime of every device in the network. Thus, an originally broadcasted wake packet may contain a first sequence number and any rebroadcast of that same wake packet may also contain the first sequence number. Maintaining the sequence number may enable devices within the fabric network to keep track of wake packets being propagated through the network.

Figure 9:
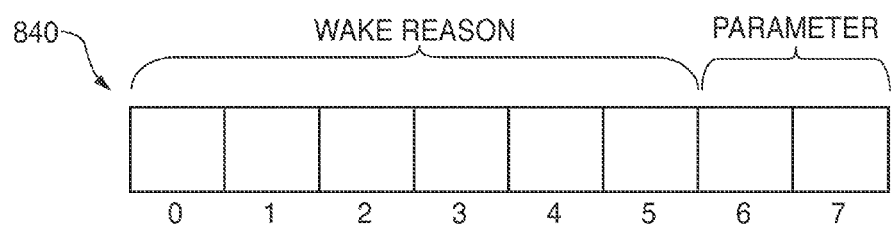
FIG. 9 shows a more detailed illustration of one of the fields of the packet of FIG. 8, according to an embodiment.

Reason field 840 may include a wake reason and parameters associated with the wake reason. FIG. 9 shows a more detailed illustration of reason field 840, according to an embodiment. As shown, reason field 840 can be a multi-bit field designed to have a first number of bits designated for wake reasons and a second number of bits designated for wake reason parameters. The wake reasons can include diagnostic tests (e.g., device specific test), network tests (e.g., network test that do not depend on the fabric network being formed), safety alarms (e.g., alarms that cause the fabric network to wake up, with further updates to follow in a fabric message), non-safety alarms (e.g., to denote pre-alarm states of an alarm or to denote security conditions), and emergency alarms (e.g., alarms generated outside of the fabric network that require activation of the fabric network). Some wake reasons may be sufficient for disseminating the appropriate message independent of a follow on fabric message. Other wake reasons may be intended to be more generic than the reason provided as part of a follow on fabric message, but the wake reason may be sufficient to enable appropriate action by devices receiving the message (e.g., cause remote devices to change a state in their respective state machine). The wake reason parameters may define one or more parameters of the wake reason. For example, for a diagnostics test, the parameters may specify what to test. For an alarm reason, the parameters may convey additional information about the alarm.

The parameter time remaining field 850 may specify the amount of time remaining for the total wake signal time period, $T_{total\_wake\_signal\_time}$. An initial broadcast of a wake packet from an originator device may specify a maximum time period for $T_{total\_wake\_signal\_time}$, but the $T_{total\_wake\_signal\_time}$ may be decremented for each subsequent rebroadcast of that same wake packet. For example, referencing FIG. 7, at time $t_0$, the $T_{total\_wake\_signal\_time}$ may be $T_A$-$t_0$, but at time $t_1$, the $T_{total\_wake\_time\_remaining}$ may be $T_A$-$t_1$, resulting in a time decrement of $t_1$-$t_0$. Authentication code field 860 may include an authentication code that is used to ensure secured wake packet transmission and reception. In some embodiments, the authentication code can be based on the sequence number, reason, and time remaining.

Referring now to FIGS. 5-8, collectively, each wake waveform 710, 720, 730, and 740 can broadcast wake packets in a non-clear channel assessment (NCCA) mode and a clear channel assessment (CCA) mode. The NCCA mode precedes the CCA mode such that the wake signal for any device includes a NCCA portion followed by a CCA portion. The NCCA and CCA portions of each wake waveform are clearly marked in FIG. 7. The time duration of the NCCA portion may be fixed, and is referred to herein as $T_{NCCA}$. In some embodiments, $T_{NCCA}$ may exceed $T_{SAMPLE}$; in some embodiments, $T_{NCCA}$ may be set to twice the duration of $T_{SAMPLE}$. The time duration of the CCA portion may be variable, and is referred to herein as $T_{CCA}$. In some embodiments, $T_{CCA}$ may be equal to the difference of $T_A$ and $T_{NCCA}$.

In the NCCA mode, the device may repeatedly broadcast its wake packets, irrespective of the state of the communication channel. Thus, in this mode, there is a possibility that wake packets may saturate the fabric network, as more than one device may be simultaneously broadcasting in the NCCA mode. For example, FIG. 7 shows that all four devices are broadcasting wake packets in the NCCA mode between times $t_2$ and $t_3$.

In the CCA mode, the device may first determine whether any other device is communicating on a channel before attempting to broadcast a wake packet. In effect, devices operating in CCA mode race each other to determine who broadcasts.

Starting at time, $t_0$, the originator device begins transmitting wake packets. Also at time, $t_0$, total wake signal waveform 750 commences. The originator device transmits wake packets in NCCA mode from time, $t_0$ to $t_1$, during which time remote devices 1 and 2 are awakened and they begin transmitting wake packets at time, $t_1$. The originator device continues to broadcast in NCCA mode until time, $t_3$, and the first and second devices broadcast in NCCA mode until time, $t_4$. When device 3 wakes up at time, $t_2$, it begins transmitting in NCCA mode until time, $t_5$. Note that the $T_{CCA}$ time for each device progressively shrinks the later a device is awoken. Even though all four devices are awake at time, $t_2$, they continue broadcasting wake packets until time, $T_A$, at which point all of the devices are awake and ready to communicate fabric messages.

Figure 10:
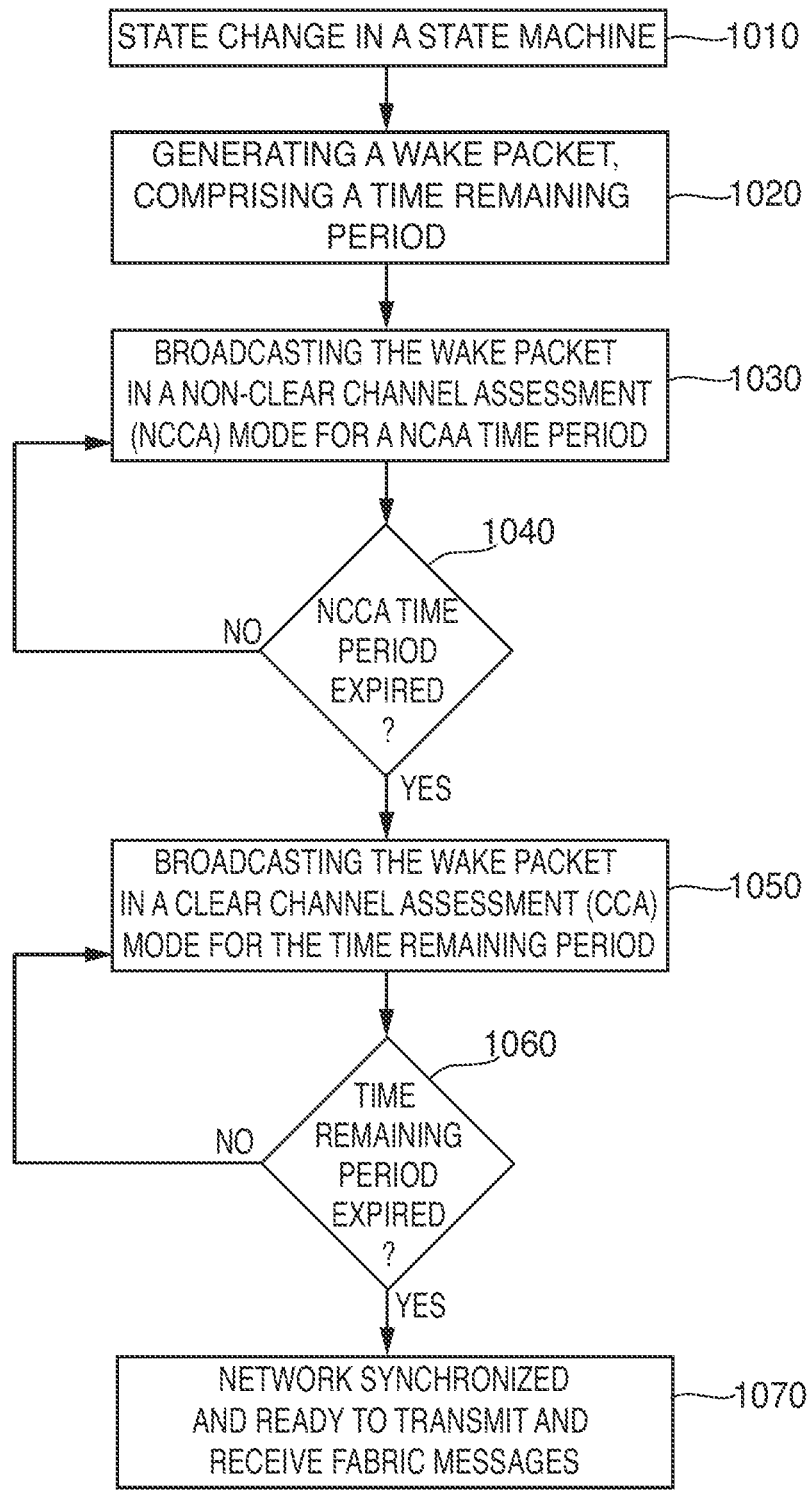
FIG. 10 shows an illustrative flowchart, according to an embodiment.

FIG. 10 shows an illustrative flowchart of steps that may be performed as part of process 1000 according to embodiment. More particularly, process 1000 may illustrate steps taken by an originator device (e.g., device 510 of FIG. 5) that initiates a fabric network wake event. Starting with step 1010, an indication of a state change in a state machine may be received. For example, one of the state machines of FIG.

3 may have changed from an IDLE state to an ALARM state. Responsive to the state change, a wake packet may be generated, at step 1020. The wake packet can be similar to wake packet 800 of FIG. 8, and can include a reason and $T_{wake\_time\_remaining}$, among other populated packet fields. In some embodiments, the reason can specify which state machine experienced the state change, and can include the new state of that state machine. For example, if the smoke sensor state machine changed to an Alarm state, the reason can include the smoke state machine and the Alarm state. It should be understood that events other than state change events may trigger an awakening of a fabric network. For example, a device may decide to run diagnostics or network tests, either of which may result in the generation of a wake packet that specifies the appropriate reason.

At step 1030, the wake packet may be broadcasted in a NCCA mode for a NCCA time period. For example, in FIG. 7, the originator device may begin broadcasting wake packets in NCCA mode at time, to. In addition, $T_{wake\_time\_remaining}$, begins at time, to, and is set to end at time, $T_A$. The originator device may continue to broadcast wake packets in the NCCA mode until the NCCA time period expires, at step 1040. It is understood that the $T_{wake\_time\_remaining}$ of each packet is adjusted as appropriate to account for the passage of time. In FIG. 7, the NCCA time period for the originator expires at time $t_3$. After the NCCA time period expires, the wake packets (with appropriately adjusted $T_{wake\_time\_remaining}$) may be broadcasted by the originator in a CCA mode for the remainder of $T_{wake\_time\_remaining}$, as indicated by step 1050. Thus, from time $t_3$ to $T_A$, the originator device may broadcast wake packets in the CCA mode. When the $T_{wake\_time\_remaining}$ expires at step 1060, the fabric network may be synchronized and ready to transmit and receive fabric message packets, as indicated by step 1070.

Figure 11:
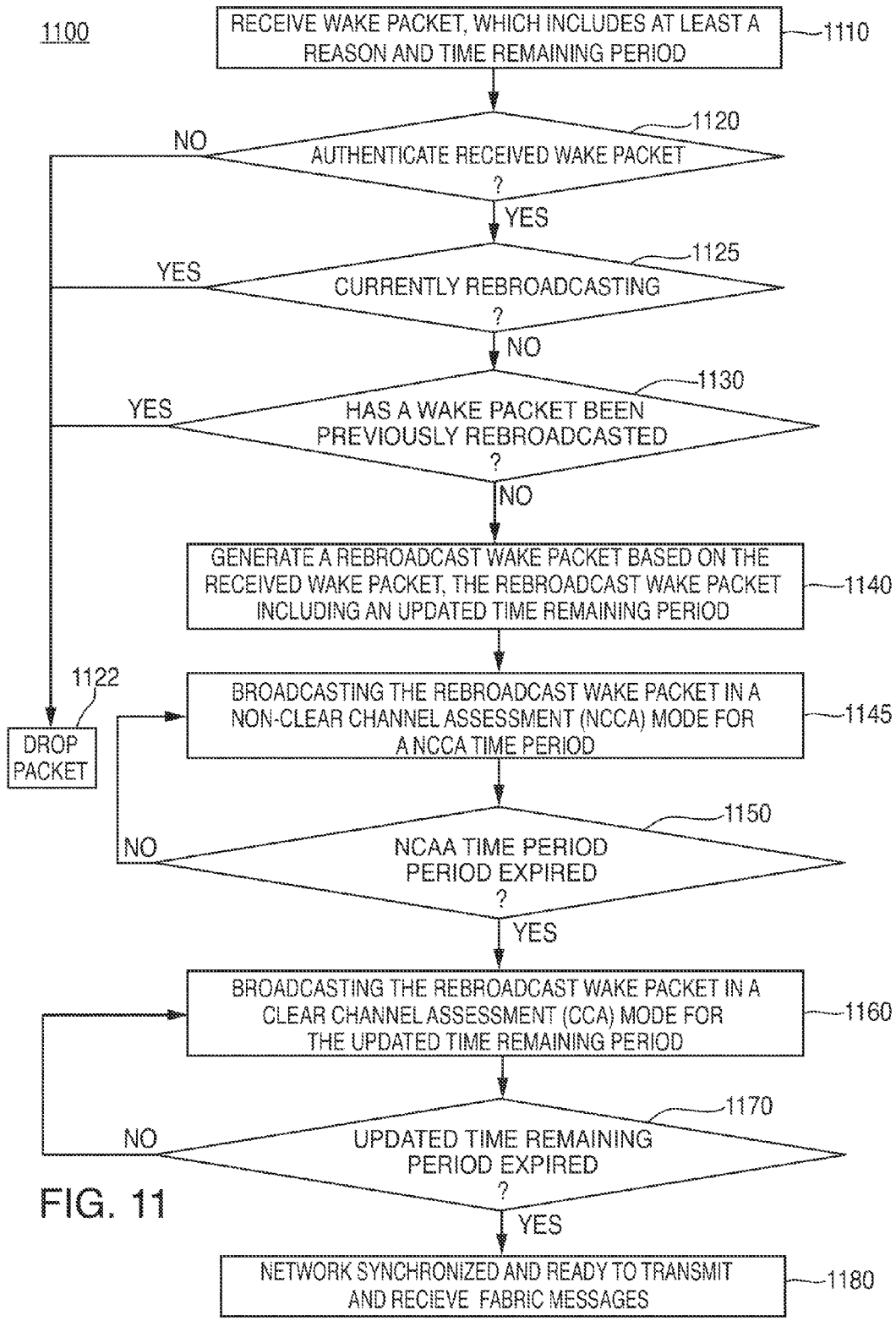
FIG. 11 shows another illustrative flowchart, according to embodiment.

FIG. 11 shows an illustrative flowchart of steps that may be performed as part of process 1100 according to embodiment. More particularly, process 1100 may illustrate steps taken by a remote device (e.g., any one of devices 520, 530, and 540 of FIG. 5) that receives a wake packet. Starting with step 1110, a wake packet may be received. The wake packet may be similar to packet 800 of FIG. 8 and includes at least a reason and $T_{wake\_time\_remaining}$. At step 1120, the received wake packet is authenticated. If the packet is not authenticated, it may be dropped at step 1122.

If the packet is authenticated, process 1100 may determine whether the device is currently rebroadcasting at step 1125. If the device is currently rebroadcasting, the received wake packet may be dropped at step 1122. If the device is not currently rebroadcasting, process 1100 may determine whether the device has already rebroadcasted the received wake packet at step 1130. To determine whether the device has already rebroadcasted the received wake packet, the device may compare components of the received wake packet (e.g., reason for wake, sequence number, source address, etc.) with components of wake packets previously rebroadcasted by the device for a match. If the determination at step 1130 is YES, process 1100 may drop the packet as indicated by step 1122. If the determination at step 1130 is NO, process 1100 may generate a rebroadcast wake packet based on the received wake packet. The rebroadcast wake packet may be a packet resembling packet 800. It may include the same sequence number and reason as the received wake packet, but may include an updated $T_{wake\_time\_remaining}$. At step 1145, the rebroadcast wake packet may be broadcasted in the NCCA mode for an NCCA time period. As explained above, adjustments are made to the updated $T_{wake\_time\_remaining}$ to reflect passage of time. In FIG. 7, both R1 and R2 devices begin broadcasting rebroadcast wake packets at time, $t_1$, in the NCCA mode and continue to broadcast in the NCCA mode until time, $t_4$. R3 may begin broadcasting rebroadcast wake packets at time $t_2$, in response to receiving a rebroadcast packet from one of device R1 and R2. Device R3 may broadcast in the NCCA mode for a NCCA time period before switching to a CCA mode at time, $t_5$. When the NCCA time period expires at step 1150, process 1100 may proceed to step 1160.

At step 1160, the rebroadcast wake packets may be broadcasted in a CCA mode for the remainder of the updated $T_{wake\_time\_remaining}$. For example, between times $t_1$ and $t_5$, device R1 may receive rebroadcast wake packets from device R3, but because device R1 has already concluded its NCCA mode broadcasts, it will not transition back into NCCA mode. It may rebroadcast, however, in the CCA mode. After the updated $T_{wake\_time\_remaining}$ expires, as determined at step 1170, the devices in the fabric network may be synchronized and ready to transmit and receive fabric message packets (step 1180). FIG. 7 illustrates how the wake sequence propagates across fabric network 500 so that each device is synchronized and ready to transmit and receive fabric message packets by time, $T_A$. Further note that because time, $T_A$, is fixed relative to the originator initial wake packet transmission, the CCA period of devices that wake up later than the originator device may be less than the CCA period of the originator device.

Figure 12:
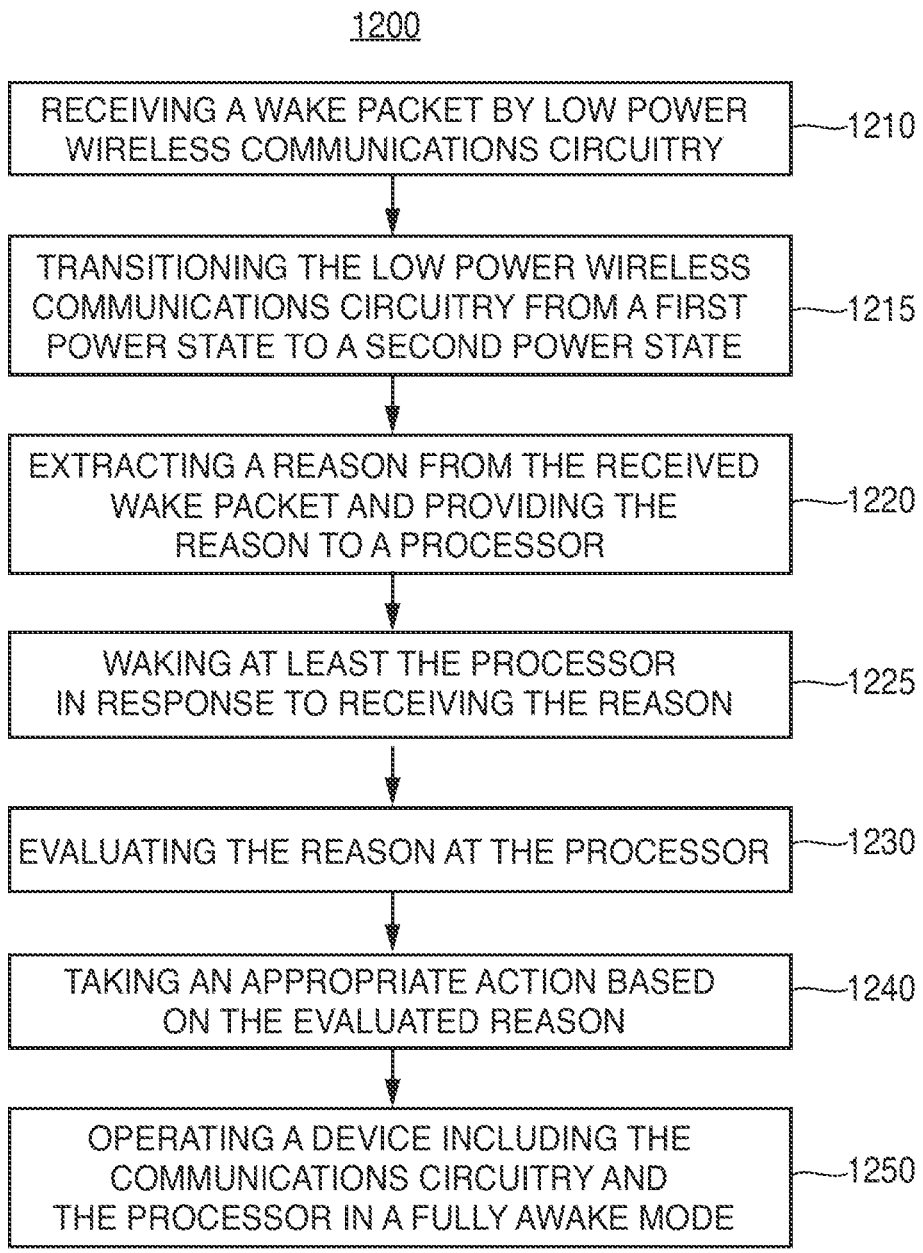
FIG. 12 shows an illustrative process of steps that may be implemented by a device in response to receiving a wake packet, according to an embodiment.

FIG. 12 shows an illustrative process 1200 of steps that may be implemented by a device in response to receiving a wake packet in accordance with an embodiment. Beginning at step 1210, a wake packet is received by the device. For the example, the packet may be received by the low power communications circuitry 214 of FIG. 2 or fabric communications circuitry 460 of FIG. 4. In one embodiment, the low power communications circuitry can be a radio configured to perform wireless communications over 802.15.4 and/or 6LOWPAN. The received wake packet can include data such as a reason, in one embodiment organized according to the format of packet 800. Upon receipt of the wake packet, the low power communications circuitry can transition from a first power state (e.g., a relatively low power sleepy state) to a second power state (e.g., a relatively high power active state), as indicated by step 1215. At step 1220, a reason can be extracted from the received wake packet and provided to another processor. The other processor can be, for example, a system processor (e.g., system processor 210 or system processor 402). In response to receiving the reason, at step 1225, the processor and/or other circuitry may wake up (e.g., transition from a relatively sleepy state to a relatively active state). When the processor is awake, it can evaluate the reason to determine an appropriate action to take, at step 1230, and take the appropriate action, at step 1240. For example, if the reason specifies that a particular state machine (e.g., any one of the state machines in FIG. 3) of the originator device has changed state, the same state machine of the remote device may change its state to match that specified in the received wake packet. As another example, the processor (e.g., system processor 210) may determine that the reason is a state change in a state machine maintained by yet another processor (e.g., safety processor 230). After making this determination, the processor (e.g., processor 210) may communicate the information to another processor (e.g., processor 230) so that that processor can make the appropriate state change in a state machine it maintains. As yet another example, if the reason specifies that the remote device should perform a particular diagnostic test, the remote device may take action to perform that test.

At step 1250, the device including the low power communication circuitry and the processor may operate in an awake mode. For example, the device may be system 400. When the processor (e.g., system processor 402) is awakened, system 400 may begin performing operations it would not otherwise normally perform when in a relatively sleepy mode. For example, other circuitry (e.g., WiFi radio, ultrasonic sensors, or speakers) within the system may turn on and begin functioning. As another example, the system processor, once has awoken and evaluated the reason for being awoken, may create relatively rich messages in response to the monitored events and communicate those relatively rich messages to other devices in the fabric.

More specifically, once the wake packets have been propagated throughout the fabric via the low power communication circuitry, the fabric may be considered to be 'synchronized' or, in other words, 'awake'. That is, as a result of the wake packets being propagated throughout the fabric of devices that was previously in a low-power monitoring state, the devices in the fabric may be operating in a relatively high power state. For example, the system processors, Wifi radios, and other circuitry may be transitioned from a low power or off state to a high power or on state. Accordingly, the system processors may be used to form and circulate relatively rich data and/or commands throughout the fabric. Such data and/or commands may include, for example, information identifying a location of the originator, instructions to increase sampling rates, etc. By activation of communication circuitry (e.g., the Wifi communication circuitry) other than the low power communication circuitry, such data and/or commands may also be communicated outside of the fabric (e.g., via an access point). Accordingly, after the devices in the fabric network are awake and synchronized, fabric messages can be broadcasted onto the network for dissemination from an originator device to any number of remote devices. The fabric messages may be transmitted according to a broadcast scheme that can operate over a multi-hop network. This broadcast scheme may be an effective transmission paradigm for networks where the number of devices is unknown or changing. In one embodiment, the scheme may define a broadcasting primitive based on broadcasting a single message to the network and flooding that message throughout the network. The scheme may separate the forwarding and dissemination of the message from the processing and understanding of the message payload. This messaging scheme may be accomplished by following a few rules and assumptions. One assumption may be that each device within a fabric network originates at most only one active message. This assumption can simplify the state tracking on each device that may be rebroadcasting a message. One of the rules may require each message to be associated with a source (or originator) device, even though the message is being rebroadcasted by other devices. This way, repeated reception of the same message can be a factor in interpreting local network density. Other rules may specify how long each device holds on to a message and when to rebroadcast the message. Finally, rules may specify when to terminate the rebroadcasts. These rules may be defined by several different parameters.

Figure 13:
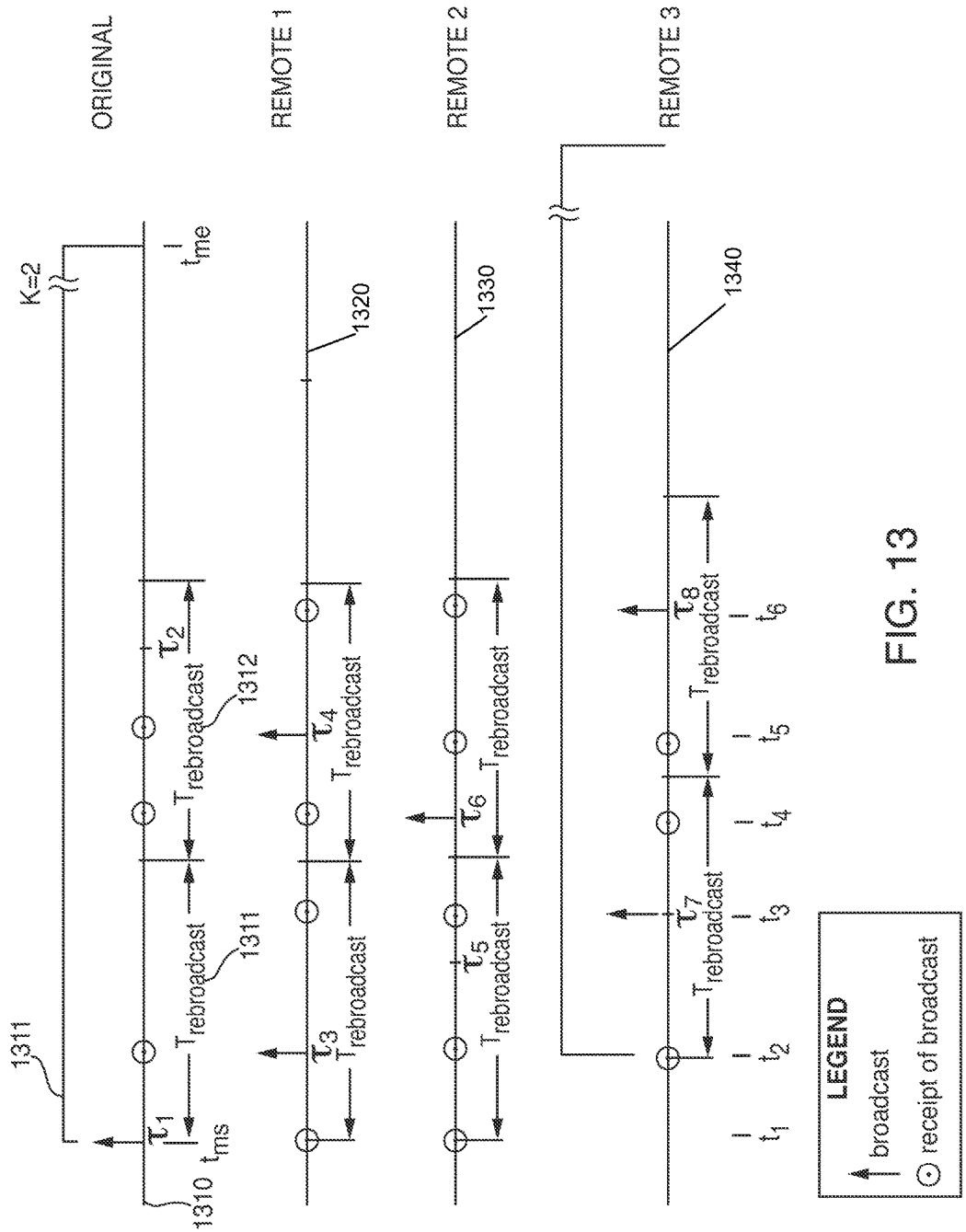
FIG. 13 shows waveforms associated with the devices of FIG. 5, according to an embodiment.

These parameters may include a message timer, a rebroadcast time period, a decision point, a counter, a threshold, and a number of rebroadcast rounds before terminating the process. These parameters are discussed in conjunction with FIG. 13, which shows illustrative timing diagrams of the messaging scheme implemented by each of the devices of FIG. 5. In particular, FIG. 13 shows waveforms 1310, 1320, 1330, and 1340 associated with original device 510, remote device 520, remote device 530, and remote device 540, respectively. For illustrative purposes only, original device 510 and remote device 540 are unable to directly communicate with each other. As such, transmissions by device 510 are not detected by device 540 and vice versa. The message timer can define how long a device tracks a particular message. Thus, when the message timer expires, the messaging scheme may cease operation with respect to that particular message. For example, waveform 1310 shows a message timer 1311 beginning at time, $t_{ms}$, and ending at time, $t_{me}$. Throughout the duration of message timer 1311, the messaging scheme may determine whether to rebroadcast the particular message. When the message timer expires, and there is no longer a condition that warrants continued broadcasting of that message, the device may cease executing the messaging scheme. In some scenarios, the message timer for that particular message may be reset if the originating device is still experiencing an event that warrants continued dissemination of that fabric message when the message timer expires.

The messaging scheme is constructed with two goals in mind: to quickly disseminate the message across the multi-hop network and to not oversubscribe the local network capacity, regardless of the number of devices in the network. To accomplish the first goal, the rebroadcast time period may define a period of time during which the messaging scheme determines whether to rebroadcast a message. Multiple rebroadcast time periods may exist within the time duration defined by the message timer. For example, waveform 1310 only shows two rebroadcast time periods, delineated by $T_{Rebroadcast\_n}$, where n represents a particular $T_{Rebroadcast}$. The rebroadcast time periods may be constant from one period to the next or they may be dynamically changed from one period to the next. For example, an initial rebroadcast time period may be set to a relatively short period, and each subsequent rebroadcast time period may double in time duration until it reach a maximum rebroadcast time period. To accomplish the goal of not oversubscribing the network, the messaging scheme keeps a counter of rebroadcasts received. The counter is reset at the beginning of the rebroadcast period, and is incremented on each reception of the message rebroadcast. The rebroadcasts may be sent either by the originator or by the remotes retransmitting the original message. Each node in the network can determine whether to rebroadcast a message by comparing this counter to a threshold within each rebroadcast period. The comparison of the counter to the threshold is performed at the decision point. The decision point is a randomly selected timer set within each rebroadcast period. The decision points in the waveforms of FIG. 13 are shown as τ. If the counter is less than or equal to the threshold at the decision point, the messaging scheme may rebroadcast the message. If the counter is greater than the threshold at the decision point, no message is rebroadcast.

The message dissemination takes place over multiple $T_{rebroadcast}$. Periodically, the originator will alter the message to indicate that the condition is still applicable and that the state information disseminated is fresh. This process may be done by periodically incrementing a sequence number. The details of the sequence number and the format of the message are described below and shown in FIG. 14. The sequence number serves to distinguish new messages from the old ones. Upon receipt of a "new" message, each node resets the counter and begins the rebroadcasting process anew, resetting all pertinent timer and counters. Old messages may be discarded and no action may be taken in response to a received old message. Duplicate messages may be processed according to process 1600, discussed below. A message may be considered a new message when the sequence number of a received message is greater than the sequence number of an original received message. A message may be considered an old message when the sequence number of a received message is less than the sequence number of an original received message. A message may be considered a duplicate message when the sequence number of a received message is equal to the sequence number of an original message.

The decision point for the original broadcasting device may be initially set to the beginning of the rebroadcast time period (at time, $t_{ms}$), but each subsequent decision point may be randomly selected at the beginning of each rebroadcast period. The decision point may be chosen randomly in the range between 0 and $T_{rebroadcast}$. For example, waveform 1310 shows that the decision point $\tau_1$ for the first rebroadcast period coincides with the beginning of the first rebroadcast period, and that the decision point 12 for the second rebroadcast period exists at a randomly chosen time within that period.

Figure 14:
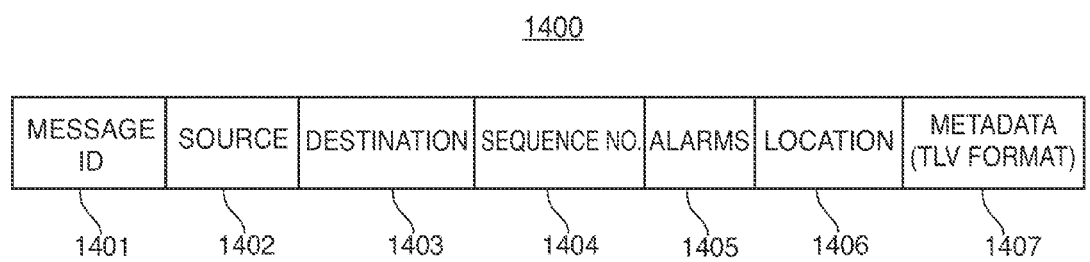
FIG. 14 shows an illustrative schematic of a message packet, according to an embodiment.

Referring now to FIG. 14, an illustrative schematic of a message packet is shown, according to an embodiment. Message packet 1400 can include fields 1401-1407. Message ID field 1401 may be used to identify the message. Source field 1402 may specify which device is the originator of the message. Destination field 1403 may indicate which device or devices are intended recipients of the message. For example, in one embodiment, all devices within the network may be the intended recipients. Sequence number field 1404 may maintain an integer number that helps to distinguish old messages from new ones. The sequence number may only be incremented by the originator. The sequence number can be reset to 0 at the beginning of the individual condition, and is periodically incremented at an interval less than the number of rebroadcast periods specified to terminate the process in FIG. 13. Alarm field 1405 may specify one or more alarms that are attributed to the message. Location field 1406 may specify a location of the one or more alarms. Metadata field 1407 may specify metadata associated with the packet. In one embodiment, the metadata may be stored in a tag length value (TLV) format.

Figure 15:
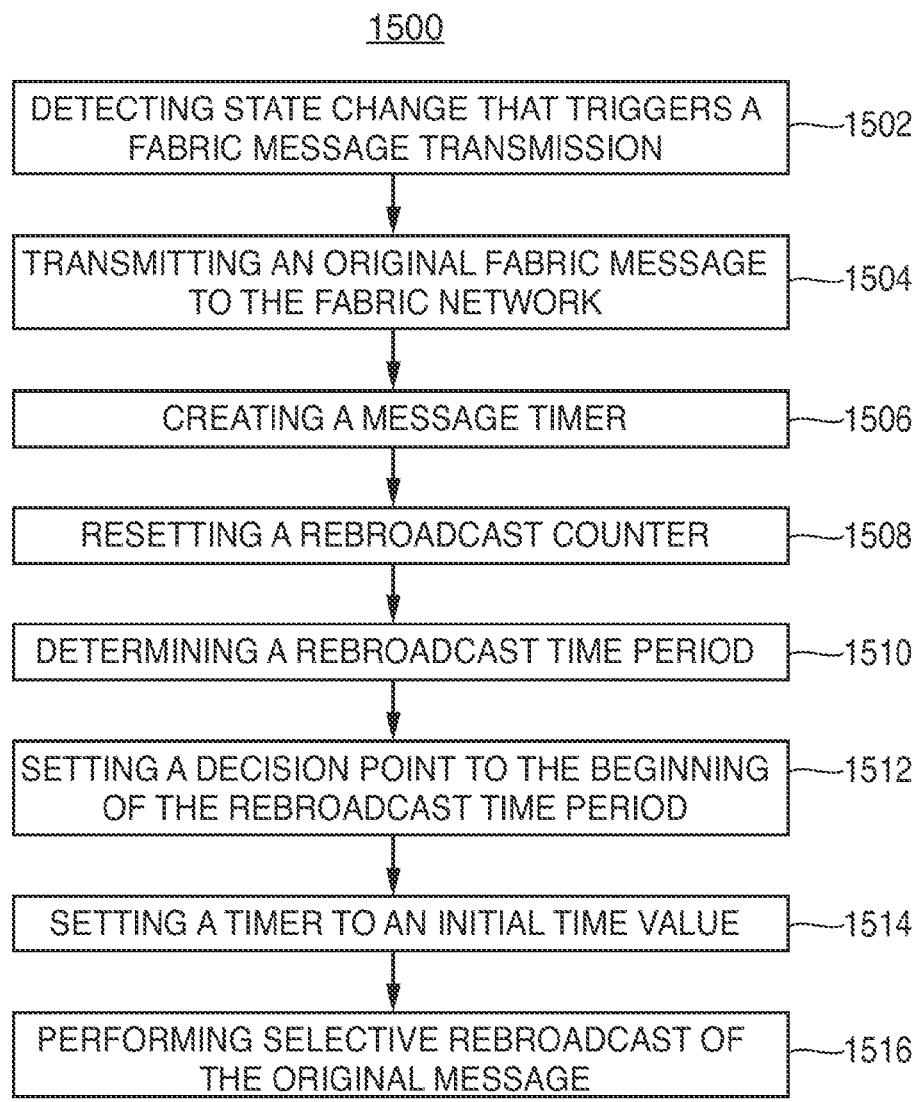
FIG. 15 shows an illustrative process being implemented by an originator device to transmit an initial fabric message, according to an embodiment.
Figure 16:
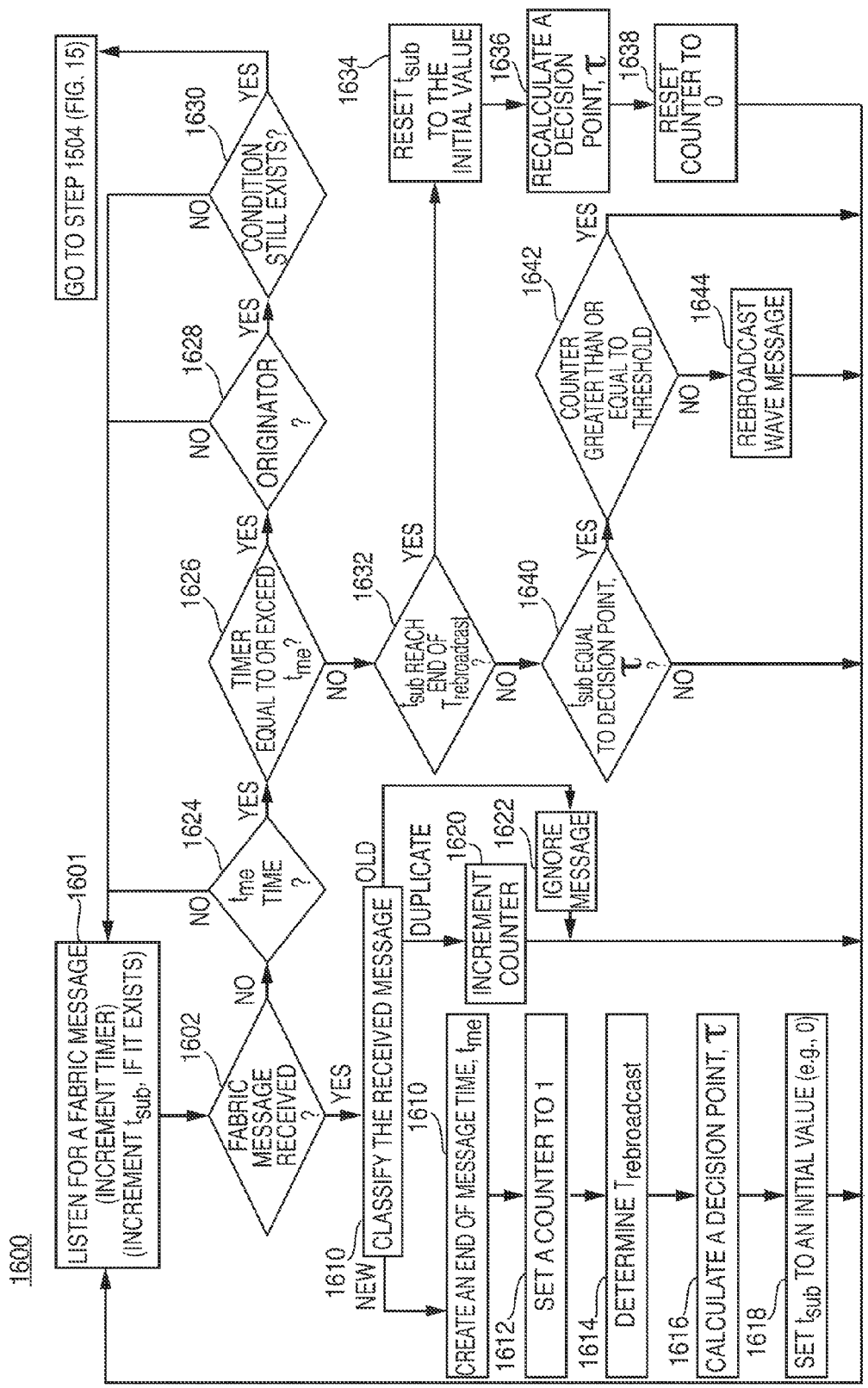
FIG. 16 shows an illustrative process being implemented by any device (including originator and remote devices) for selectively rebroadcasting a message, according to an embodiment.

Reference is now made collectively to FIGS. 13, 15, and 16. FIG. 15 shows an illustrative process 1500 being implemented by an originator device to transmit an initial fabric message, according to an embodiment. FIG. 16 shows an illustrative process 1600 being implemented by any device (including originator and remote devices) for selectively rebroadcasting a message. Starting with step 1502 of FIG. 15, a state change event is detected that triggers a need to transmit a fabric message. This state change event can be any suitable event. For example, the state change event can be the same state change event that caused an originator device to wake other devices within a fabric network. As another example, the state change event can occur in a remote device that needs to transmit its own original message (e.g., a hush message). At step 1504, an original fabric message is broadcasted to the fabric network. The original fabric message may resemble packet 1400 of FIG. 14 and can specify, among other things, that it is an original message being originally transmitted from an originator device (e.g., device 510). FIG. 13 shows this original message being broadcasted at time, $t_1$, in waveform 1310. The message may be broadcasted according to any suitable protocol an over any suitable wireless communication medium. For example, the message may be broadcasted over 802.15.4 via, e.g., 6LoWPAN (and using, e.g., low power wireless communications circuitry 214). For another example, the message may be broadcasted over 802.11 (and using, e.g., high power wireless communications circuitry 212). In some embodiments the messages may be communicated immediately after one another over the different wireless communication mediums. In other embodiments, the messages may be communicated using only one of the wireless communication mediums. In addition, the device may broadcast the message in a CCA mode. FIG. 13 shows that remote devices 1 and 2 receive the original broadcast (as indicated by the circles aligned co-linearly with the broadcast) but that remote device 3 does not receive the original broadcast directly from the originator device. As shown, remote device 3 receives a rebroadcast of the original message from remote device 1, at time, $t_2$.

Commensurate with transmission of the original message, a message timer associated with the original message is created, at step 1506. As shown in FIG. 13, the message timer commences at time, $t_{ms}$, and ends at time, $t_{me}$. At step 1508, a rebroadcast counter is reset. At step 1510, a rebroadcast time period is determined, and is illustrated in FIG. 13 as $T_{Rebroadcast}$. At step 1512, the initial decision point (shown as $\tau_1$) for the originator device is set to the beginning of the rebroadcast time period $T_{Rebroadcast}$. At step 1514, a timer, $t_{sub}$, is set to an initial time value such as zero. $T_{sub}$, may represent the real time within a given rebroadcast time period. For example, the $t_{subs}$ are shown as times $t_1$-$t_6$ in FIG. 13. Each of steps 1506, 1508, 1510, 1512, and 1514 may be performed commensurate with or immediately after the broadcast of the original message. After completion of step 1512, process 1500 may selectively rebroadcast the original message at step 1516. The selective rebroadcasting of step 1516 may be embodied in process 1600 of FIG. 16, which is now described.

Starting at step 1601, a device listens for a fabric message. Process 1600 may be maintaining a timer (for comparison to a message tinier) and a $t_{sub}$ timer, if it exist. At step 1602, a determination is made as to whether a fabric message is received. For example, at time $t_1$, of FIG. 13, both remote devices 1 and 2 receive the original broadcast from the originator device. If a message is received, at step 1604, the process may classify the received message according to a type, including new, duplicate, and old. Each device may maintain a list of messages it has received and compare any received message to that list. A message may be classified as a new message if the device has not previously received an original message. Alternately, each device may remember the current sequence number of the message being rebroadcasted, and the decision whether the incoming message is old, duplicate, or new may be done via an integer comparison. For example, at time, $t_1$, both remote devices 1 and 2 may consider receipt of the original message as a new message (since, e.g., the sequence number of the message received by remote devices 1 and 2 is greater than the sequence numbers of any messages previously received by remote devices 1 and 2), and at time, $t_2$, in response to remote 1 rebroadcasting the message, remote device 3 may consider receipt of the message as new (since, e.g., the sequence number of the message received by remote device 3 is greater than the sequence number of any messages previously received by remote device 3), but remote device 2 and originator device may classify the received message as being not new. If the received message is not new, but is a duplicate of a message the device is configured to rebroadcast, that message may be considered a duplicate message. For example, at time, $t_2$, remote device 2 and originator device may consider receipt of the message as a duplicate by comparing the sequence number of the received message to the original message (and in some embodiments, other previously received messages) and recognizing that the sequence number of the received message is the same as the sequence number of the original message. If the received message is not new, but is a duplicate of a message the device was previously configured to rebroadcast, that message may be considered an old message. For example, by comparing the sequence number of the received message to original message (and in some embodiments, other previously received messages) and recognizing that the sequence number of the received message is less than the sequence number of the original message.

Receipt of a message classified as a new message is now discussed. At step 1610, an end of message time, $t_{me}$, associated with the device that received the new message is created. At step 1612, a counter associated with the device that received the new message may be set to an initial count value. For example, the counter may be set to a value of 1. At step 1614, a rebroadcast time period may be determined, and at step 1616, a decision point, $\tau$, is randomly calculated to exist within the rebroadcast time period. At step 1618, tub may be set to an initial value (e.g., 0). In FIG. 13, both remote devices 1 and 2 may perform each of steps 1610, 1612, 1614, 1616, and 1618 at time, $t_1$, and remote device 3 may do the same at time, $t_2$. The end of message times associated with devices 1 and 2 may be substantially the same as the message timer associated with the originator device. The end of message time associated with device 3 may have the same duration as the other devices' message times, but is time delayed by the difference between times, $t_1$ and $t_2$. After step 1618, process 1600 may proceed back to step 1601.

If, at step 1604, the message is classified as a duplicate message, the counter may be incremented at step 1620, and process 1600 may return to step 1601. As explained above, the counter keeps track of how many duplicate messages are received by the device. At time, $t_1$, remote devices 1 and 2 each have a counter count of one, and the originator device and remote device 3 each have a counter count of zero. At time, $t_2$, the counts of the originator, first, second, and third devices are one, one, two, and one, respectively. If, at step 1604, the message is classified as an old message, the message may be ignored or dropped at step 1622, and process 1600 may return to step 1601.

If at step 1602, no message is received, process 1600 determines whether an end of message timer ($t_{me}$) exists at step 1624. If the determination at step 1624 is NO, process 1600 reverts back to step 1601. If the determination is YES, process 1600 may determine whether the timer meets or exceeds the $t_{me}$, at step 1626. If the determination at step 1660 is YES, process 1600 proceeds to step 1628 to determine whether the device is the originator of the message that has an expired message timer. If the determination at step 1628 is YES, a determination is made at step 1630 whether the event that triggered broadcast of the original message still exists. If the determination at step 1630 is YES, process 1600 returns to step 1504 (of FIG. 15) so that originator device can broadcast another new message that indicates that the trigger event still persists. If the determination at any one of steps 1628 and 1630 is NO, process 1600 for that device returns to step 1601. If the determination at step 1626 is NO, process 1600 proceeds to step 1632.

At step 1632, a determination is made whether tub has reached the end of the $T_{rebroadcast}$. If the determination at step 1632 is YES, process 1600 may reset the tub to the initial value (e.g., 0) at step 1634, calculate a new decision point, $\tau$, at step 1636, and reset the counter to 0 at step 1638. For example, after the timer reaches the end of $T_{rebroadcast}$ 1311, the timer is reset for $T_{rebroadcast}$ 1312, the counter is reset to 0 at the beginning of $T_{rebroadcast}$ 1312, and the decision point, $\tau 2$, is calculated to exist between $T_{rebroadcast}$ 1312. After step 1638, process 1600 may proceed to step 1601.

If the determination at step 1632 is NO, process may proceed to step 1640, which determines whether $t_{sub}$ is equal to the decision point, $\tau$. The decision points in FIG. 13 are shown by the tau's, $\tau$. If the determination at step 1640 is YES, process 1600 determines at step 1642 whether the counter is equal to or greater than a threshold. If the determination at step 1642 is NO, the received message is rebroadcasted (at step 1644). The rebroadcasted message can be the duplicate message or the new message. If the determination at step 1640 is NO or the determination at 1642 is YES, process 1600 returns to step 1601.

Assume that the threshold being applied by process 1600 is 2. The decision made at step 1642 is now discussed for each of the devices shown in FIG. 13. With respect to the originator device, the decision point, $\tau_1$, is set to the beginning of rebroadcast period_1 and thus is not given the opportunity to rebroadcast until rebroadcast period_2. At decision point, $\tau_2$, the counter for the originator device is at 2 (since messages have been received at times, $t_4$ and $t_5$), which is equal to the threshold. As a result, the originator device does not rebroadcast a message at decision point, $\tau_2$. In remote device 1, the counter is at 1 at decision point, $\tau_3$, which is less than the threshold, thereby resulting in a message rebroadcast. Also, at decision point, $\tau_4$, a message is rebroadcasted because the counter is at one. In remote device 2, no message is rebroadcasted at decision point 15 because the counter is at two, but a message is rebroadcasted at decision point to because the counter is at zero. In remote device 3, a message is rebroadcasted at decision point $\tau_7$ because the counter is at zero, and a message is rebroadcasted at decision point $\tau_8$ because the counter is at one.

FIG. 17 shows illustrative timing diagrams of a two device fabric network according to embodiment. The behavior of the timing diagrams may be controlled by processes 1500 and 1600 of FIGS. 15 and 16. As shown, device 1 may act as an originator in broadcasting original message, M1 at $T_{M1}$. For example, message M1, may be a smoke alarm message. Commensurate with the broadcast of message M1, message timer T1 commences. Device 2 receives the broadcast of message T1 and starts its message timer T1. At decision point $\tau_1$, message M1 is rebroadcasted by device 2 and is received by device 1. At decision point $\tau_2$, device 2 may rebroadcast message M1. Device 1 may receive this rebroadcast, and rebroadcast message M1 at decision point $\tau_3$. Devices 1 and 2 may continue to selectively rebroadcast until message timer $T_1$ expires. At $T_{M2}$, device 2 may broadcast an original message M2, starting a new message timer, $T_2$, for message M2. At $T_{M2}$, both devices 1 and 2 may maintain independent processes for each message. As a result, devices 1 and 2 may rebroadcast both messages M1 and M2 until their respective message timers expire. Message M2 may be a hush message, for example Message M2 is received by device 1, which starts a new message timer, $T_2$, for device 1. At decision point 16, device 1 rebroadcast message M2.

Any processes described with respect to FIGS. 1-17, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions that can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A method for communicating messages among devices of a fabric network, comprising:
managing, for a received message, a plurality of variables, the plurality of variables comprising a counter, a rebroadcast time period, a rebroadcasting decision point, and a first timer, wherein the rebroadcasting decision point exists within the rebroadcast time period, wherein the counter is incremented when the received message is classified as a duplicate message, and wherein the first timer is reset at a beginning of the rebroadcast time period;
determining when the first timer is equal to the rebroadcasting decision point;
rebroadcasting the received message if the counter is determined to be less than a threshold when the first timer is determined to be equal to the rebroadcasting decision point;
determining whether the first timer has reached an end of the rebroadcast time period; and
in response to determining that the first timer has reached the end of the rebroadcast time period:
resetting the first timer;
recalculating the rebroadcast decision point; and
resetting the counter.

2. The method of claim 1, further comprising:
receiving a message from any one of the other devices of the fabric network; and
classifying the received message.

3. The method of claim 2, wherein when the received message is classified as a new message, the method further comprising:
creating an end of message timer;
setting the counter to a first value;
determining the rebroadcast time period;
calculating the decision point that exists within the rebroadcast time period; and
setting the first timer to an initial value.

4. The method of claim 2, wherein when the received message is classified as a duplicate message, the method further comprising:
incrementing the counter.

5. The method of claim 2, wherein when the received message is classified as an old message, the method further comprising:
ignoring the received message.

6. The method of claim 2, wherein the classifying the received message comprises evaluating a sequence number of the received message to classify it according to one of a new message, a duplicate message, and an old message.

7. The method of claim 1, wherein the plurality of variables further comprises an end of message time and a second timer, the method further comprising:
determining whether the second timer has reached the end of message time; and
in response to determining that the second timer has reached the end of message time, ceasing the rebroadcasting of the new message.

8. The method of claim 1, wherein the plurality of variables further comprises an end of message time and a second timer, the method further comprising:
determining whether the second timer has reached the end of message time;
in response to determining that the second timer has reached the end of message time, determining whether the device is an originator of the received message; and
selectively transmitting a new message if the device is the originator of the received message.

9. The method of claim 2, wherein when the received message is classified as a new message, the method further comprising:
extracting information from the new message; and
providing at least a portion of the extracted information to a processor that manages at least one state machine.

10. The method of claim 9, wherein the processor instructs the at least one state machine to change state based on the extracted information.

11. The method of claim 1 wherein the received message comprises a plurality of fields including:
a source field that identifies the originator device of the received message;
a destination field that specifies which devices of the fabric network are intended recipients of the received message; and an alarm field that specifies information of at least one alarm.

12. A method for communicating messages among devices of a fabric network, comprising:
detecting a state change that triggers a message transmission from an originator device, wherein in response to the detecting, the method further comprises:
broadcasting a message from the originator device;
creating a message timer;
resetting a counter;
determining a rebroadcast time period that repeats for the duration of the message timer; and
selectively rebroadcasting the message during any one of the repeated rebroadcast time periods;
setting a timer to an initial time value at the beginning of each rebroadcast time period
resetting the counter at the beginning of each repeated rebroadcast time period; and
randomly selecting a decision point that exists within each repeated subsequent rebroadcast time period.

13. The method of claim 12, wherein in response to the detecting, the method further comprises:
setting a decision point to coincide with a start time of an initial rebroadcast time period.

14. The method of claim 12, further comprising:
receiving the message from a device other than the originator device;
incrementing the counter;
determining, at the decision point, whether the counter is less than a threshold; and
in response to determining that the counter is less than the threshold at the decision point, rebroadcasting the message.

15. The method of claim 12, wherein the selectively rebroadcasting the message during any one of the repeated rebroadcast time periods continues until the message timer elapses.

16. The method of claim 12, wherein the selectively rebroadcasting the message during any one of the repeated rebroadcast time periods continues until a state change occurs that causes the message to cease being selectively rebroadcasted.

17. A device for communicating messages among devices of a fabric network, comprising:
communications circuitry operative to transmit and receive wireless signals; and
a processor coupled to the communications circuitry and operative to:
manage, for a received message, a plurality of variables, the plurality of variables comprising a counter, a rebroadcast time period, a rebroadcasting decision point, and a first timer, wherein the rebroadcasting decision point exists within the rebroadcast time period, wherein the counter is incremented when the received message is classified as a duplicate message, and wherein the first timer is reset at a beginning of the rebroadcast time period;
determine when the first timer is equal to the rebroadcasting decision point;
rebroadcast the received message if the counter is determined to be less than a threshold when the first tinier is determined to be equal to the rebroadcasting decision point
determine whether the first timer has reached an end of the rebroadcast time period; and
in response to determining that the first timer has reached the end of the rebroadcast time period:
reset the first timer;
recalculate the rebroadcast decision point; and
reset the counter.

18. The device of claim 17, wherein the processor is operative to:
receive a message from any one of the other devices of the fabric network; and
classify the received message.

19. The device of claim 18, wherein when the received message is classified as a new message, the processor is operative to:
create an end of message timer;
set the counter to a first value;
determine the rebroadcast time period;
calculate the decision point that exists within the rebroadcast time period; and
set the first timer to an initial value.

20. The device of claim 18, wherein when the received message is classified as a duplicate message, the processor is operative to:
increment the counter.

21. The device of claim 18, wherein when the received message is classified as an old message, the processor is operative to:
ignore the received message.

22. The device of claim 18, wherein the processor is operative to:
classify it according to one of a new message, a duplicate message, and an old message.

23. The device of claim 17, wherein the plurality of variables further comprises an end of message time and a second timer, the processor is operative to:
determine whether the second timer has reached the end of message time; and
in response to determining that the second timer has reached the end of message time, cease the rebroadcasting of the new message.

24. The device of claim 17, wherein the plurality of variables further comprises an end of message time and a second timer, the processor is operative to:
determine whether the second timer has reached the end of message time;
in response to determining that the second timer has reached the end of message time, determine whether the device is an originator of the received message; and
selectively transmit a new message if the device is the originator of the received message.

25. The device of claim 18, wherein when the received message is classified as a new message, the processor is operative to:
extract information from the new message; and
provide at least a portion of the extracted information to a processor that manages at least one state machine.

26. The device of claim 25, wherein the processor instructs the at least one state machine to change state based on the extracted information.

27. The method of claim 17 wherein the received message comprises a plurality of fields including:
a source field that identifies the originator device of the received message;
a destination field that specifies which devices of the fabric network are intended recipients of the received message; and
an alarm field that specifies information of at least one alarm.

28. The device of claim 17, wherein the processor is operative to:

determine whether the first timer has reached an end of the rebroadcast time period;

in response to determining that the first timer has reached the end of the rebroadcast time period, reset the first timer;

recalculate the rebroadcast decision point; and reset the counter.

29. A device for communicating messages among devices of a fabric network, comprising:

communications circuitry operative to transmit and receive wireless signals; and a processor coupled to the communications circuitry and operative to:

detect a state change that triggers a message transmission from an originator device, wherein in response to the detecting, the processor is further operative to:

broadcast a message from the originator device;

create a message timer;

reset a counter;

determine a rebroadcast time period that repeats for the duration of the message timer;

selectively rebroadcast the message during any one of the repeated rebroadcast time periods;

set a timer to an initial time value at the beginning of each rebroadcast time period reset the counter at the beginning of each repeated rebroadcast time period; and randomly select a decision point that exists within each repeated subsequent rebroadcast time period.

30. The device of claim 29, wherein in response to the state change detection, the processor is operative to:

set a decision point to coincide with a start time of an initial rebroadcast time period.

31. The device of claim 30, wherein the processor is operative to:

set a timer to an initial time value at the beginning of each rebroadcast time period.

32. The device of claim 31, wherein the processor is operative to:

reset the counter at the beginning of each repeated rebroadcast time period; and randomly select a decision point that exists within each repeated subsequent rebroadcast time period.

33. The device of claim 31, wherein the processor operative to:

receive the message from a device other than the originator device;

increment the counter;

determine, at the decision point, whether the counter is less than a threshold; and in response to determining that the counter is less than the threshold at the decision point, rebroadcast the message.

34. The device of claim 29, wherein the selective rebroadcast of the message during any one of the repeated rebroadcast time periods continues until the message timer elapses.

35. The device of claim 29, wherein the selective rebroadcast of the message during any one of the repeated rebroadcast time periods continues until a state change occurs that causes the message to cease being selectively rebroadcasted.

* * * * *